US012597180B2

(12) United States Patent
Babur et al.

(10) Patent No.: US 12,597,180 B2
(45) Date of Patent: Apr. 7, 2026

(54) ARTIFICIAL INTELLIGENCE AUGMENTATION OF GEOGRAPHIC DATA LAYERS

(71) Applicant: DP WORLD LOGISTICS US HOLDINGS, INC., Auburn Hills, MI (US)

(72) Inventors: Mohammed Ismaeel Babur, Temple City, CA (US); Yury Sokolov, La Mesa, CA (US); Dihan Yang, Alhambra, CA (US)

(73) Assignee: DP WORLD LOGISTICS US HOLDINGS, INC., Auburn Hills, MI (US)

( * ) Notice: Subject to any disclaimer, the term of this patent is extended or adjusted under 35 U.S.C. 154(b) by 70 days.

(21) Appl. No.: 18/645,254

(22) Filed: Apr. 24, 2024

(65) Prior Publication Data

US 2024/0362836 A1     Oct. 31, 2024

Related U.S. Application Data

(60) Provisional application No. 63/462,925, filed on Apr. 28, 2023.

(51) Int. Cl.
| | |
|---|---|
| *G06T 7/13* | (2017.01) |
| *G06T 11/20* | (2006.01) |
| *G06T 11/40* | (2006.01) |

(52) U.S. Cl.
CPC .............. *G06T 11/203* (2013.01); *G06T 7/13* (2017.01); *G06T 11/40* (2013.01)

(58) Field of Classification Search
CPC .......... G06T 7/13; G06T 11/203; G06T 11/40
(Continued)

(56) References Cited

U.S. PATENT DOCUMENTS

| | | | |
|---|---|---|---|
| 9,411,898 B1 | 8/2016 | Ward | |
| 10,593,074 B1 * | 3/2020 | Friedman | ............ G06F 3/04842 |

(Continued)

OTHER PUBLICATIONS

Wenwen Li et al., GeoAI for Large Scale Image Analysis and Machine Vision: Recent Progress of Artificial Intelligence in Geography, ISPRS International Journal of Geo-Information, 2022, 11(7), 385, Jul. 2022, pp. 1-44.*

(Continued)

*Primary Examiner* — Jacinta M Crawford
(74) *Attorney, Agent, or Firm* — Seyfarth Shaw LLP

(57) ABSTRACT

A method for gap filling geographic information service data includes determining a bounding region at or near an initial alignment. The method also includes determining the initial alignment within the bounding region. A corridor buffer is generated at or near the initial alignment, and within the bounding region. Cost layer data is processed. Incompleteness of a number of polygon-bounded areas is determined based on the cost layer data. Partial completeness of the polygon-bounded areas and completeness of the polygon-bounded areas are also determined based on the cost layer data. A synthetic completeness of the number of polygon-bounded areas is generated based on the incompleteness, the partial completeness, synthetic completeness, and completeness of the polygon-based areas. A rasterized cost map including the completeness and the synthetic completeness of the polygon-bounded areas is stored at the processor(s) and in memory(ies).

20 Claims, 20 Drawing Sheets

(58) Field of Classification Search
USPC ........................................................ 345/420
See application file for complete search history.

(56) References Cited

U.S. PATENT DOCUMENTS

| | | | |
|---|---|---|---|
| 12,229,712 | B1 | 2/2025 | Merchan et al. |
| 2006/0242108 | A1 | 10/2006 | Cuspard et al. |
| 2012/0274642 | A1 | 11/2012 | Ofek et al. |
| 2012/0320089 | A1* | 12/2012 | Kreft ........................ G06T 11/60 |
| | | | 345/629 |
| 2015/0154323 | A1 | 6/2015 | Koch et al. |
| 2017/0329875 | A1 | 11/2017 | Detwiler et al. |
| 2019/0164313 | A1 | 5/2019 | Ma et al. |
| 2022/0341752 | A1 | 10/2022 | Broadway et al. |
| 2023/0154316 | A1 | 5/2023 | Najar-Robles et al. |
| 2024/0362374 | A1 | 10/2024 | Babur et al. |
| 2024/0362375 | A1 | 10/2024 | Babur et al. |
| 2024/0362837 | A1 | 10/2024 | Babur et al. |
| 2024/0362841 | A1 | 10/2024 | Babur et al. |

OTHER PUBLICATIONS

ArcGISPro_2.6, "Edit elevation pixels" and "Pixelate a confidential region," 2020 (Year: 2020).
Climate Data Tools, 2019 https://iri.columbia.edu/-rijaf/CDTUserGuide/index.html, IRI International Research Institute for Climate and Society (Year: 2019).
Grass Gis, "Grass Gis manual: r.fill.gaps", 2017 (Year: 2017).
Q. Tang and W. Dou, "A fast shortest path method based on multi-resolution raster model," 2020 19th International Symposium on Distributed Computing and Applications for Business Engineering and Science (DCABES), pp. 259-262 (Year: 2020).
Yonetani et al. "Path Planning using Neural A* Search", Proceedings of the 38 th International Conference on Machine Learning, PMLR 139, 2021 (Year: 2021).

* cited by examiner

301

301

ARTIFICIAL INTELLIGENCE AUGMENTATION OF GEOGRAPHIC DATA LAYERS

CROSS-REFERENCE TO RELATED APPLICATION

The present application claims the benefit of U.S. Provisional Patent Application No. 63/462,925, filed on Apr. 28, 2023, and titled "ARTIFICIAL INTELLIGENCE AUGMENTATION OF GEOGRAPHIC DATA LAYERS," the disclosure of which is expressly incorporated by reference in its entirety.

BACKGROUND

Geographic information service ("GIS") data is freely available for use. Researchers and developers make use of GIS data in order to accomplish a number of goals ranging from climate change, infrastructure development, energy conservation, natural resource conservation, and more. While GIS data is generally far reaching in scope, the data itself may have gaps. Such gaps affect the ability of researchers and developers to reliably use the GIS data for many purposes. For instance, GIS data may be sufficient to design and build a hiking trail in a wooded area; however, the same data may be incomplete when building a freeway that requires eminent domain proceedings, heavy equipment, hours of manpower, etc.

Many researchers and developers augment GIS data with additional data sources to address gaps. However, gaps in the GIS data may still remain, especially if the use of the GIS data is for complex infrastructure deployments. Hyperloop infrastructure is among the most complex form of linear infrastructure to deploy in the infrastructure development industry. For example, high-speed turns at 500 km/h require highly calibrated tracks which, in turn, require infrastructure to support the tracks.

Therefore, what is needed is a solution that addresses the gaps in not only GIS data but any data related to the design, simulation, and deployment of linear infrastructure.

SUMMARY

The present disclosure is set forth in the independent claims, respectively. Some aspects of the disclosure are described in the dependent claims.

In one aspect of the present disclosure, a method for gap filling of geographic information service ("GIS") data is presented. The method includes determining, at at least one processor, a bounding region at or near an initial alignment. The method also includes determining, at the at least one processor, the initial alignment within the bounding region. The method additionally includes generating, at the at least one processor, a corridor buffer at or near the initial alignment, and within the bounding region. The method further includes processing, at the at least one processor, cost layer data. The method still further includes determining, at the at least one processor and based on the cost layer data, incompleteness of a number of polygon-bounded areas. The method also includes determining, at the at least one processor and based on the cost layer data, partial completeness of the polygon-bounded areas. The method further includes determining, at the at least one processor and based on the cost layer data, completeness of the polygon-bounded areas. The method still further includes generating, at the at least one processor and based on the incompleteness, the partial completeness, synthetic completeness, and completeness of the polygon-based areas, the synthetic completeness of the polygon-bounded areas. The method also includes storing, at the at least one processor and in at least one memory, a rasterized cost map, the rasterized cost map including the completeness and the synthetic completeness of the polygon-bounded areas.

Another aspect of the present disclosure is directed to an apparatus including means for determining, at at least one processor, a bounding region at or near an initial alignment. The apparatus also includes means for determining, at the at least one processor, the initial alignment within the bounding region. The apparatus additionally includes means for generating, at the at least one processor, a corridor buffer at or near the initial alignment, the corridor buffer being within the bounding region. The apparatus further includes means for processing, at the at least one processor, cost layer data. The apparatus further includes means for determining, at the at least one processor and based on the cost layer data, incompleteness of a number of polygon-bounded areas. The apparatus further includes means for determining, at the at least one processor and based on the cost layer data, partial completeness of the polygon-bounded areas. The apparatus further includes means for determining, at the at least one processor and based on the cost layer data, completeness of the polygon-bounded areas. The apparatus further includes means for generating, at the at least one processor and based on the incompleteness, the partial completeness, synthetic completeness, and completeness of the polygon-based areas, the synthetic completeness of the polygon-bounded areas. The apparatus further includes means for storing, at the at least one processor and in at least one memory, a rasterized cost map, the rasterized cost map including the completeness and the synthetic completeness of the polygon-bounded areas.

In another aspect of the present disclosure, a non-transitory computer-readable medium with program code recorded thereon is disclosed. The program code is executed by one or more processors and includes program code to determine, at the one or more processors, a bounding region at or near an initial alignment. The program code also includes program code to determine, at the processor(s), the initial alignment within the bounding region. The program code additionally includes program code to generate, at the processor(s), a corridor buffer at or near the initial alignment and within the bounding region. The program code further includes program code to process, at the processor(s), cost layer data. The program code still further includes program code to determine, at the processor(s) and based on the cost layer data, incompleteness of a number of polygon-bounded areas. The program code also includes program code to determine, at the processor(s) and based on the cost layer data, partial completeness of the polygon-bounded areas. The program code further includes program code to determine, at the processor(s) and based on the cost layer data, completeness of the polygon-bounded areas. The program code still further includes program code to generate, at the processor(s) and based on the incompleteness, the partial completeness, synthetic completeness, and completeness of the polygon-based areas, the synthetic completeness of the polygon-bounded areas. The program code also includes program code to store, at the processor(s) and in a memory(ies), a rasterized cost map including the completeness and the synthetic completeness of the polygon-bounded areas.

Another aspect of the present disclosure is directed to an apparatus having one or more memories and one or more processors coupled to the one or more memories. The processor(s) is configured to determine a bounding region at or near an initial alignment. The processor(s) is configured to determine the initial alignment within the bounding region. The processor(s) is configured to additionally generate a corridor buffer at or near the initial alignment, the corridor buffer being within the bounding region. The processor(s) is configured to process cost layer data. The processor(s) is to still further configured to determine based on the cost layer data, incompleteness of a number of polygon-bounded area. The processor(s) is configured to determine based on the cost layer data, partial completeness of the polygon-bounded areas. The processor(s) is configured to determine based on the cost layer data, completeness of the polygon-bounded areas. The processor(s) is further configured to generate based on the incompleteness, the partial completeness, synthetic completeness, and completeness of the polygon-based areas, the synthetic completeness of the polygon-bounded areas. The processor(s) is configured to store in the memory(ies), a rasterized cost map including the completeness and the synthetic completeness of the polygon-bounded areas.

BRIEF DESCRIPTION OF DRAWINGS

The accompanying drawings, which are incorporated herein and constitute part of this specification, illustrate exemplary aspects of the claims, and together with the general description given above and the detailed description given below, serve to explain the features of the claims.

4

Figure 5:
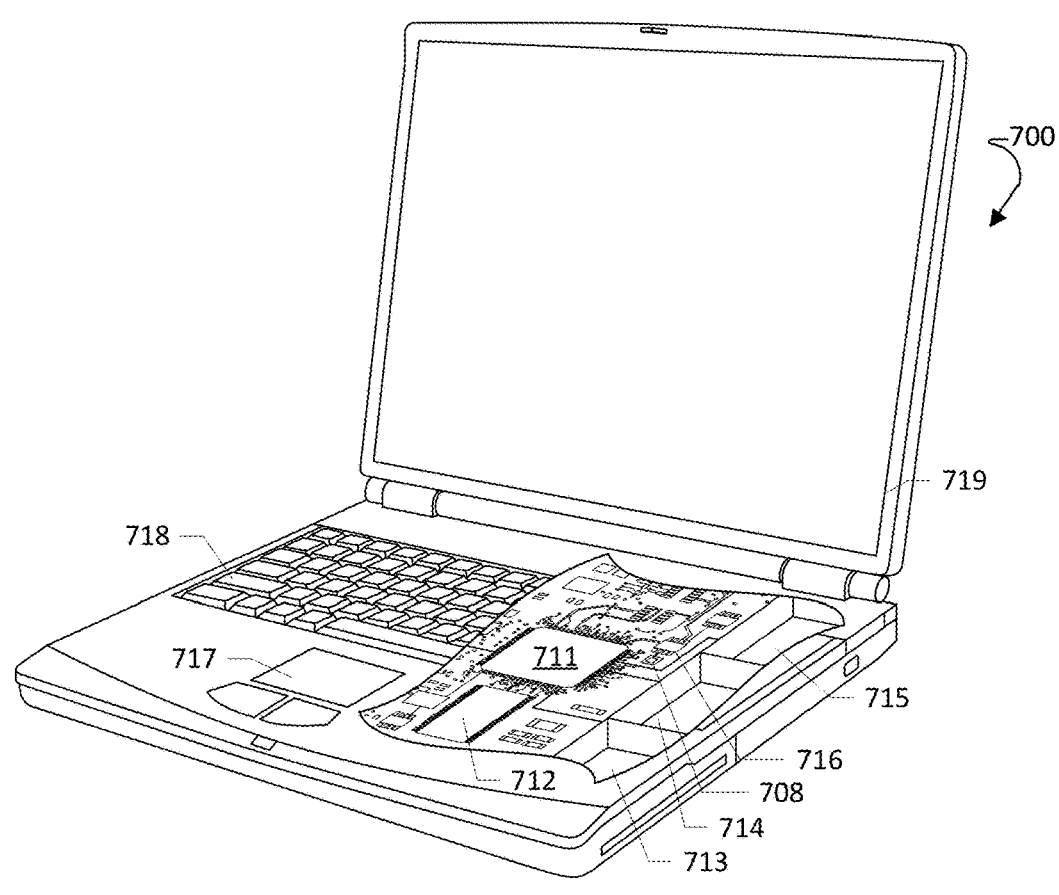

FIG. 5 is a block diagram illustrating an example computing device suitable for use with the various aspects described.

Figure 6:
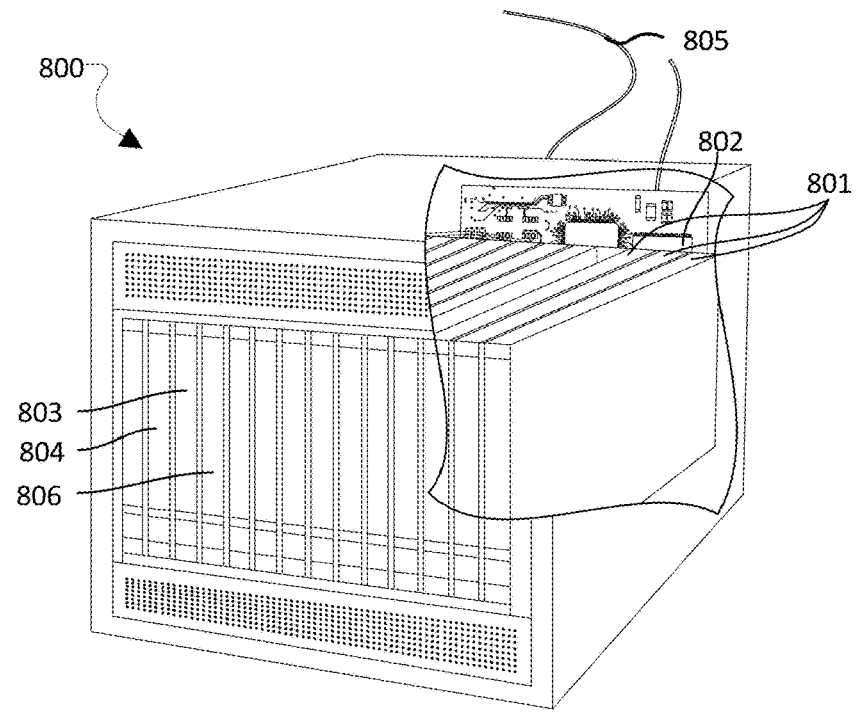

FIG. 6 is a block diagram illustrating an example server suitable for use with the various aspects described.

DETAILED DESCRIPTION

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Costs are generally comprised of more than one underlying cost. For example, acquiring land has a purchase price, which is one component of a cost. Another component of the cost may be the costs associated with construction on the acquired land. If the acquired land is difficult to traverse, then construction costs may be unusually high when compared to similarly priced parcels. In essence, two parcels may be similarly priced but have disparate costs when considered for infrastructure deployment. Therefore, cost evaluation needs to be comprehensive and deep.

Components of a cost are typically represented on two-dimensional ("2-D") maps. For example, a parcel map may have latitude and longitude coordinates of parcel boundaries. A cost map comprising land values may be overlaid upon the parcel map to observe land values. Further, a cost map comprising construction costs may be overlaid on the land value cost map. Cost layers may be combined in any conceivable order and in any number. In one aspect, a particular cost layer may have a higher weight when compared to other cost layers.

However, costs require input data in order to be leveraged for alignment/profile optimizations. For example, a first parcel may have complete geographic information service ("GIS") data as well as associated land values. However, an adjacent parcel may only have partially complete GIS data and no associated land values. When optimizing the alignment, artificial intelligence ("AI") systems and networks may not have sufficient data to optimize the alignment because the second parcel only has partially complete data.

The disclosed solution is configured to determine existing completeness of data for alignment/profile optimizations. Further, the disclosed solution is configured to use the determinations to synthetically complete gaps in the data. Given the complexity of linear infrastructure, having complete (or synthetically complete) data enables not only better manual designs of infrastructure, but also enhanced AI-based optimizations.

As shall be described, the benefits of the disclosed solution include decreasing time to market, increasing operating profit, decreasing power consumption, optimizing land use, increasing passenger and/or cargo throughput, protecting environmental resources, reducing pollution, reducing reliance on fossil fuels, preserving historical sites, preserving cultural sites, reducing capital costs of infrastructure, increasing passenger safety, preserving natural resources, preserving biological resources, reducing noise, increasing reliability and maintainability of infrastructure, and the like.

Figure 1:
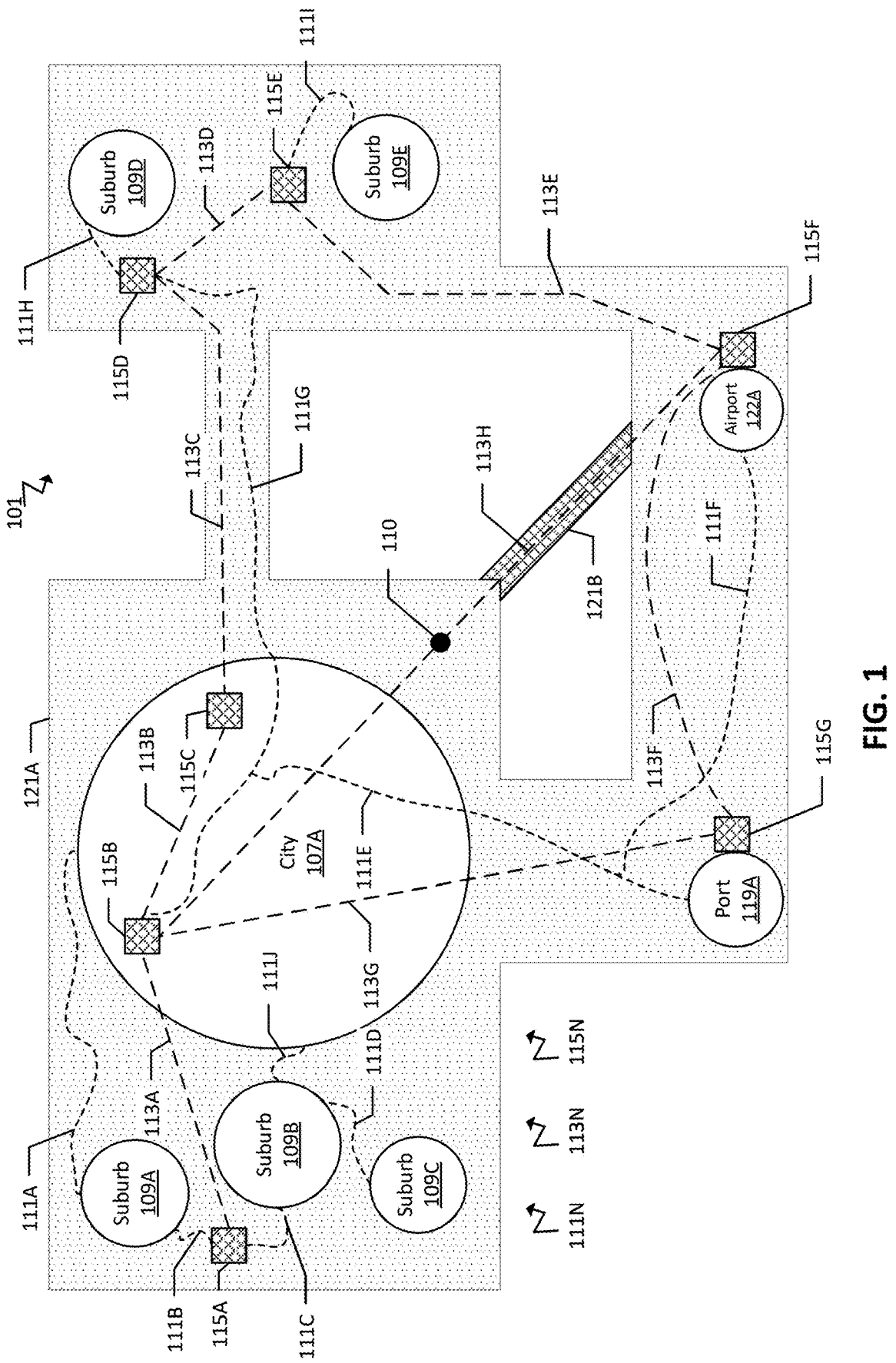
FIG. 1 is a block diagram illustrating a transportation network.

FIG. 1 is a block diagram illustrating a transportation network 101 that demonstrates the complexity of linear infrastructure. A hyperloop vehicle 110 is shown in the instant view. The transportation network 101 is deployed within a land area 121A. The land area 121A is defined by a number of parameters. For instance, the land area 121A is defined by land that is owned, purchasable, and/or liquid. In some areas of the world, land is unavailable for use as the land may be designated as a nature preserve, in which case no transportation mode may be deployed therein. In another situation, the land may be unavailable for purchase due to competing economic uses (e.g., an industrial company is using the land for extraction of mineral resources). As such, the land outside the shaded land area 121A may be considered unusable by the transportation network 101.

A city 107A is disposed on the land area 121A. The city 107A is considered a large city (e.g., London, Mumbai, etc.). As such, the city 107A is connected by a myriad of transportation modes including rail, automobile, ship, etc. Many cities are surrounded by smaller municipalities or suburbs. For illustrative purposes, the cities and suburbs referred to should generally be considered relative and not exact. For instance, a suburb in China may be considered a large city in Eastern Europe or Australia. One of skill in the art will appreciate that some metropolitan areas are large and some are small.

The land area 121A comprises a first suburb 109A, a second suburb 109B, a third suburb 109C, a fourth suburb 109D, and a fifth suburb 109E. The suburbs 109A, 109B, 109C, 109D, 109E are generally considered metropolitan areas that are smaller in both size and population than a similarly situated city (e.g., the city 107A). In one aspect, the suburbs 109A, 109B, 109C, 109D, 109E may generally be considered single-use areas of land, e.g., a particular suburb may be substantially residential while another suburb may be substantially commercial. On the other hand, the city 107A may be of mixed use where residential, commercial, and industrial use all coexist.

The transportation network 101 comprises a first portal 115A, a second portal 115B, a third portal 115C, a fourth portal 115D, a fifth portal 115E, a sixth portal 115F, and a seventh portal 115G. The portals 115A, 115B, 115C, 115D, 115E, 115F, 115G form a plurality of portals 115N. The plurality of portals 115N includes locations where the hyperloop vehicle 110 may perform a number of actions, including but not limited to: load passengers, unload passengers, load cargo, unload cargo, perform maintenance, remove hyperloop vehicles from service, add hyperloop vehicles to service, change operating personnel, etc. One of skill in the art will appreciate that the plurality of portals 115N may have slightly different functionalities but perform many similar functions. For example, a seaport coupled to a portal may have many of the characteristics of a seaport and a train station, plus the unique aspects of hyperloop (e.g., emissionless vehicles, moving platforms, high speeds, etc.).

The transportation network 101 comprises a port 119A. The port 119A may be generally configured to dock ships at berths, in one aspect. For example, cargo is predominately transported by sea via container-based cargo ships. When cargo ships dock, the cargo containers are unloaded onto dry land. Traditionally, a semi-truck arrives with a trailer to receive and deliver cargo containers.

The transportation network comprises an airport 122A. The airport 122A is generally configured to enable air-based modes of transportation (e.g., airplane, helicopter, etc.). In the instant example, the airport 122A serves the city 107A, the port 119A, and the suburbs 109A, 109B, 109C, 109D, 109E.

The portal 115A is connected to the portal 115B via a route 113A. The route 113A is generally configured to provide an operating environment for the hyperloop vehicle 110. The route 113A, for instance, may be comprised of an elevated series of pylons that support an above-ground tube, e.g., a "hyperstructure." Within the tube, a near-vacuum pressure environment provides lowered air resistance, thus increasing velocity, energy efficiency, etc. In another aspect, the route 113A may be subterranean and contained within a similar tube as the above-ground example. While the route 113A, and many other similar illustrations, are denoted with substantially straight lines, one of skill in the art will appreciate that natural curves and turns would be present for a hyperstructure in a commercial deployment.

A route 113B connects the portal 115B to the portal 115C. A route 113C connects the portal 115C to the portal 115D. A route 113D connects the portal 115D to the portal 115E. A route 113E connects the portal 115E to the portal 115F. A route 113F connects the portal 115F to the portal 115G. A route 113G connects the portal 115G to the portal 115B. A route 113H connects the portal 115F, near the airport 122A, to the portal 115B.

The route 113H is disposed along a land area 121B. The land area 121B may be considered a congested area of land that has minimal room for additional hyperloop tracks disposed along the route 113H (as one form of linear infrastructure). On the one hand, the route 113H provides substantially direct access between the airport 122A and the city 107A. On the other hand, the route 113H may become quickly overwhelmed by traffic demand, due in part to the narrowness of the land area 121B.

The routes 113A, 113B, 113C, 113D, 113E, 113F, 113G form a plurality of routes 113N having substantially similar characteristics. One of skill in the art will appreciate that the plurality of portals 115N and the plurality of routes 113N are used for illustrative purposes and may have multiple instances within a particular location. For instance, the portal 115A may be comprised of three smaller portals (not shown) that form a discrete transportation network. The plurality of routes 113N may be comprised of hyperstructures that may be subterranean, underwater, on-ground, above-ground, or a combination thereof.

A plurality of roads 111N comprises a first road 111A, a second road 111B, a third road 111C, a fourth road 111D, a fifth road 111E, a sixth road 111F, a seventh road 111G, an eighth road 111H, a ninth road 111I, and a tenth road 111J. The plurality of roads 111N support any existing mode of ground transportation, including, but not limited to, automobile, rail, trolley, subway, bus, or a combination thereof. In modernized cities, high-speed rail may be considered a right-of-way user of the plurality of roads 111N. One of skill in the art will appreciate the plurality of roads 111N is utilized for illustrative purposes and may, in one aspect, simply be the means by which an existing, non-hyperloop vehicle travels.

The road 111A connects the suburb 109A to the city 107A. The road 111B connects the portal 115A to the suburb 109A. The road 111C connects the portal 115A to the suburb 109B. The road 111D connects the suburb 109B to the suburb 109C. The road 111E connects the port 119A to the city 107A. The road 111F connects the airport 122A to the road 111E. The road 111G connects the city 107A to the portal 115D. The road 111H connects the portal 115D to the suburb 109D. The road 111I connects the portal 115E to the suburb 109E. The road 111J connects the city 107A to the suburb 109B.

In one aspect, the suburbs 109A, 109B, 109C, 109D, 109E are connected to the city 107A. In many metropolitan areas, people reside in suburbs and commute to larger city centers. The cities generally have more commercial and industrial opportunities for workers. Stated differently, the land use in the suburbs 109A, 109B, 109C, 109D, 109E may be quite different than that of the city 107A because the suburbs 109A, 109B, 109C, 109D, 109E are primarily residential, and the city 107A is mixed-use. One reason for the difference is simply the land use density in the city is denser than that of the suburbs.

In one aspect, the hyperloop portal 115A is an example of how the suburbs 109A, 109B may utilize hyperloop. For instance, a worker living in the suburb 109A may take the road 111B to the portal 115A where the worker may park their car in a garage. Then, the worker may use the hyperloop route 113A to arrive at the portal 115B within the city 107A. The worker could then walk to a nearby place of work (e.g., an office complex).

In another example, the hyperloop portal 115E is positioned at the right side of the land area 121A. One of skill in the art will appreciate that most of the suburbs 109A, 109B, 109C, 109D, 109E are connected by the plurality of roads 111N. However, the introduction of the hyperloop portal 115E on the right side of the land area 121A provides an opportunity for land use at and around the hyperloop portal 115E.

The plurality of roads 111N and the plurality of routes 113N form a mesh by redundantly connecting many points within the transportation network 101 (e.g., the suburb 109B has several entries and exits). In contrast, the suburb 109E is only connected by the road 111I. Such a deployment is an example of how a hyperloop portal may encourage growth in an underutilized area of land, such as suburb 109E, because suburb 109E is made part of the mesh network by portal 115E. A new, efficient mode of transportation like hyperloop may encourage people in the city 107A to purchase land in the vicinity of the portal 115E in order to avoid congestion, noise, pollution, inadequate schools, crime, etc. However, such an increase in population density may correspondingly increase traffic demand, which influences the configuration of new and existing hyperloop routes.

The topology of the transportation network 101 is influenced by a number of factors. For example, the suburb 109E is connected to the road 111I that leads to the portal 115E. One of skill in the art will appreciate how the use of roads to and from the suburb 109E is minimal due to (1) the proximity of the portal 115E and (2) the suburb 109E being built with the portal 115E as a primary mode of transportation for the area. Therefore, the inhabitants of the suburb 109E largely rely on hyperloop for transportation needs when traveling beyond the nearby area of the suburb 109E. As such, the inhabitants of the suburb 109E may rely on fewer transportation modes. In contrast, the inhabitants of the city 107A have multiple points of access to roads and hyperloop routes. Such considerations may affect traffic demand including, for example, inhabitants in the suburb 109E may place more demand on the hyperloop routes in the vicinity of the suburb 109E compared to roads in the same area. In short, hyperloop portals need to consider the demographics of the areas serviced in order to configure a hyperloop portal for the deployment environment.

The hyperloop portal 115F is positioned substantially near the airport 122A to illustrate that in some implementations, a portal may be tightly coupled to a nearby location. In the instant example, the airport 122A may unload passengers, near the portal 115F, directly into hyperloop vehicles traveling toward the city 107A. The portal 115G is shown as being tightly coupled to the port 119A. In one aspect, cargo ships docking at the port 119A may unload cargo containers bound for the city 107A. Prior to the introduction of the portal 115G, cargo had to be carried via the road 111E using traditional semi-trucks.

The route 113G connects the portal 115G to the portal 115B. The route 113G may be specially configured to carry cargo-laden hyperloop vehicles that are destined for the city 107A, in one aspect. In another aspect, the hyperloop vehicles traveling along the route 113G may be a mix of passenger-configured and cargo-configured hyperloop vehicles. The route 113F connects the portal 115G to the portal 115F and may be utilized for a combination of passenger and cargo traffic. For instance, passengers may arrive at the airport 122A, enter the portal 115F, travel via the route 113F to the portal 115G, and finally travel along the route 113G to arrive at the portal 115B. In another example, cargo may be offloaded from an airplane at the airport 122A and then be transported to the port 119A via the route 113F. Likewise, the cargo may be transported between the port 119A and the city 107A (or to any other destination).

Figure 2A:
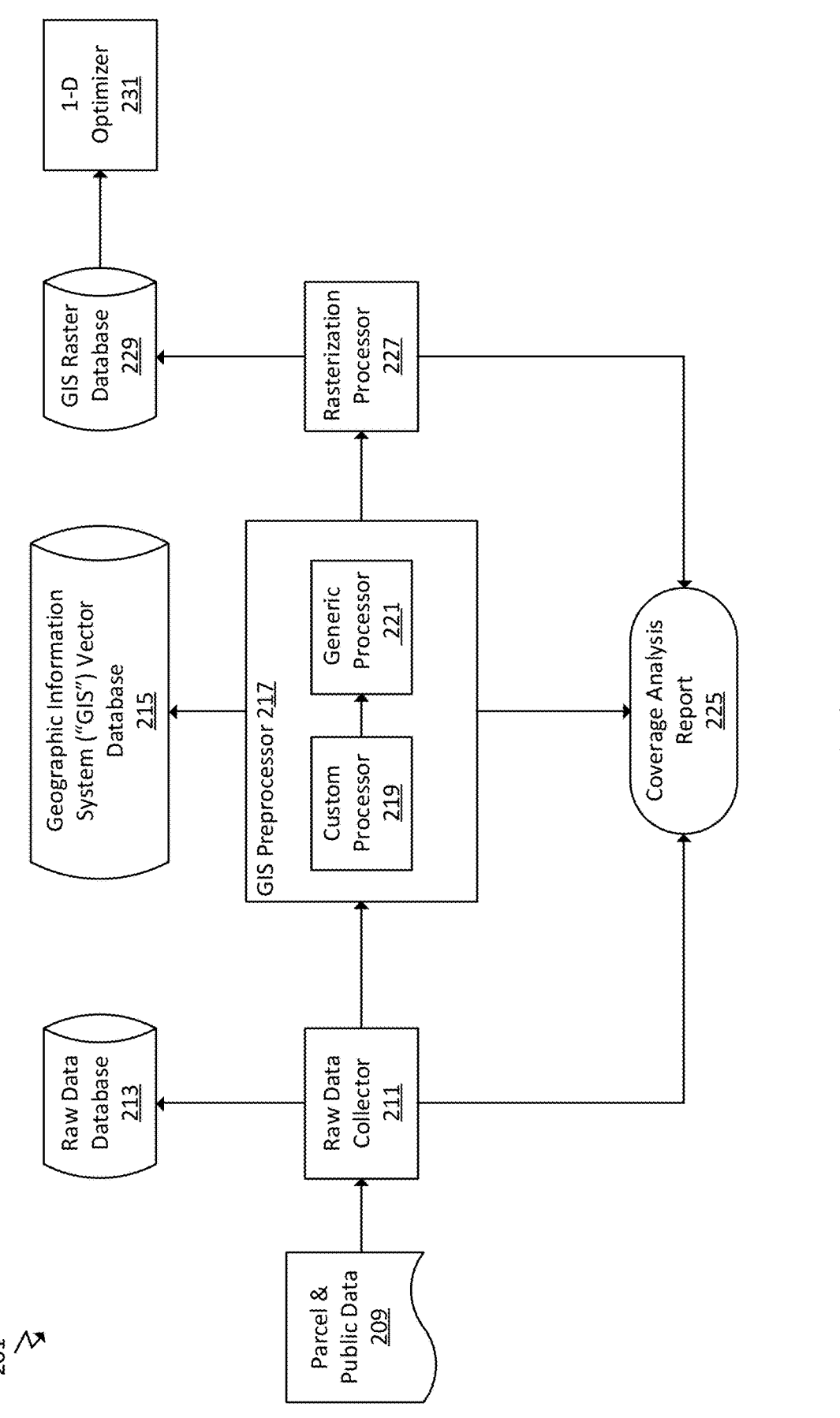
FIG. 2A is a block diagram illustrating a geographic information system ("GIS") management system.

FIG. 2A is a block diagram illustrating a geographic information system ("GIS") management system 201. The GIS management system 201 is generally configured to provide GIS information to a one-dimensional ("1-D") optimizer 231. A coverage analysis report 225 may also be generated by the GIS management system 201 for use by designers, civil engineers, operators, etc.

The 1-D optimizer 231 is generally configured to optimize for a single dimension having multiple parameters along a particular alignment. In general, the 1-D optimizer 231 may create an optimal design in one dimension, in which that one dimension includes multiple design and configuration parameters. For example, the 1-D optimizer 231 may optimize a vertical profile of an alignment to reduce capital expenditure costs that are necessary to deploy a hyperloop route (e.g., the route 115A). The 1-D optimizer 231 also accounts for vehicle acceleration limits, passenger acceleration limits, jerk limits, grade constraints (e.g., gradeability), motor acceleration, motor power capabilities, braking capabilities, thermal limits, etc. The 1-D optimizer 231 may also consider parameters from other dimensions to understand some three-dimensional constraints.

The 1-D optimizer 231 may rely on local multivariate optimization for a piecewise continuous spline with nonlinear constraints using a Broyden-Fletch-Goldfarb-Shanno ("BFGS") algorithm and/or a Sequential Least Squares Programming ("SLSQP") algorithm. Optimization types for entities with multi-order continuity at the boundaries may include a genetic algorithm and/or a particle swarm algorithm. Depending on the context, one of skill in the art will appreciate that one or both algorithms may be utilized.

The 1-D optimizer 231 is further configured to be utilized during trip simulations such that kinematic-related optimizations may be tested. For example, peak velocity may be selected as the trajectory (or drive strategy) to optimize; the trip simulation may then utilize and validate the 1-D optimization of kinematics related to the hyperloop vehicle 110 during operation. Likewise, the trip simulation may inform the 1-D optimizer 231 of any deficiencies discovered during the simulation, and/or be used to understand the full kinematic constraints to be considered for the 1-D optimizer 231 to further optimize an alignment and profile.

The GIS management system 201 is configured to receive parcel and public data 209 and/or uploaded private data (not shown). The parcel and public data 209 and/or uploaded private data may be parcel maps of land areas. In one aspect, the parcel maps may be augmented with prices indicating the value of the land (as well as any improvements thereto). The value of land may be considered by the 1-D optimizer 231 when optimizing an alignment and profile. In one aspect, the parcel and public data 209 and/or uploaded private data may be any public data relating to land value, land use, land prices, property taxes, ownership, encumbrances, historical status, environmental protection status, topography, utilities, geology, water bodies, vegetation, or maps based on certain analyses including flood maps, seismic risk maps, or the like. Such information may be utilized by the 1-D optimizer 231 in order to generate optimized alignments and potential profiles.

A raw data collector 211 is generally configured to configure and store data of various types and formats. One of skill in the art will appreciate that GIS data may be received in many different formats. For example, GIS data may be received as vectorized data or rasterized data. The raw data collector 211 processes disparate types of data. One of skill in the art will appreciate that such a benefit provides users with ease of use because various types of data may be aggregated and processed such that the user is free to focus on designing the hyperloop route.

A raw data database 213 is generally accessible by the raw data collector 211 in order to write or read raw GIS data. The raw data collector 211 is configured to output the raw GIS data to the coverage analysis report 225, such that a consumer of the coverage analysis report 225 may access the raw GIS data supporting other processed outputs (e.g., rasterizations). The coverage analysis report 225 contains the details of what factors and objectives were considered when determining an alignment and profile. For example, a hyperloop route may be optimized such that the hyperloop route traverses a plot of land. During eminent domain proceedings, the coverage analysis report 225 provides a detailed and objective source of information to support or refute an eminent domain claim.

The coverage analysis report 225 may be regenerated based on considerations uncovered as part of new events. For example, the coverage analysis report 225 may be regenerated during an eminent domain proceeding in order to arrive at a more optimized solution for stakeholders involved in the eminent domain proceedings. One of skill in the art will appreciate that the disclosed solution may arrive at the same optimization in many cases; nevertheless, the coverage analysis report 225 provides a critical source of information as to what data was considered when arriving at the same optimization.

A GIS preprocessor 217 comprises a custom processor 219 and a generic processor 221. The GIS preprocessor 217 is generally configured to preprocess the raw GIS data sent by the raw data collector 211. The raw GIS data may thereafter be considered preprocessed GIS data. The preprocessed GIS data may be written to the coverage analysis report 225 or to a GIS vector database 215. The GIS vector database 215 is accessible by the GIS preprocessor 217 in order to write or read vectorized data.

The custom processor 219 is generally configured to address situations where the cost of traversing a particular GIS data layer is unknown (or unsatisfactory for optimization). The GIS data layer may be manipulated such that a cost function may be derived for an optimization. For example, a GIS data layer for terrain may include only raw elevation data; the custom processor 219 may use the raw elevation data to generate a meaningful cost metric, such as a slope raster in order to have a slope cost function. As another example, a body of water represented in a GIS data layer may not have a cost function associated with crossing the body of water. Likewise, the custom processor 219 generates a cost function based on traversing the body of water via a tunnel or bridge. The output of the custom processor 219 is then communicated to the generic processor 221 for further operations (e.g., normalization).

The generic processor 221 is generally configured to normalize any cost functions in the GIS data layer. Often, the GIS data layer contains the necessary cost functions. For example, a terrain map may be associated with the prices of land. However, even with a cost function present, the GIS data layer may still need further normalization and processing prior to consumption by additional AI algorithms, systems, modules, etc.

A rasterization processor 227 is generally configured to receive the preprocessed GIS data from the GIS preprocessor 217. The rasterization processor 227 is configured to rasterize any data into an aggregated image with multiple raster bands. For example, the GIS data received from the GIS preprocessor 217 may be vectorized data. As such, the rasterization processor 227 may rasterize the vectorized data into a single image with multiple raster bands. Each raster band may be further placed in a data structure, such as a tree or other structure, based on the various resolutions of the raster bands (or entire image itself), thus providing a user with the capability to explore the data in an efficient and responsive manner. The rasterization processor 227 is configured to output the rasterized GIS data to a GIS raster database 229. In one aspect, the GIS raster database 229 then communicates the rasterized GIS data to the 1-D optimizer 231.

Figure 2B:
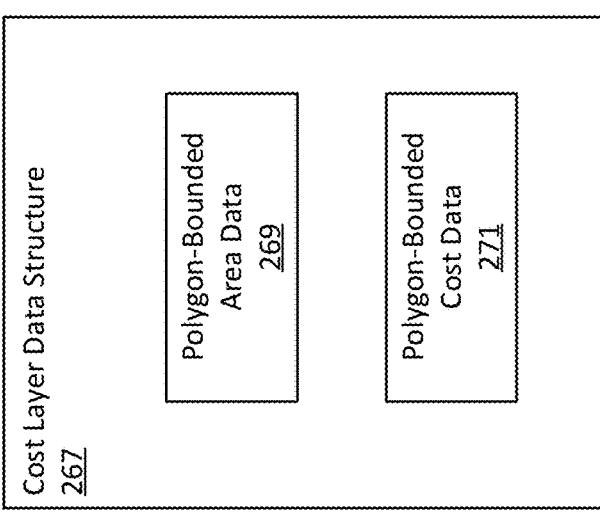
FIG. 2B is a block diagram illustrating a cost map data structure and a cost layer data structure.
Figure 2B:
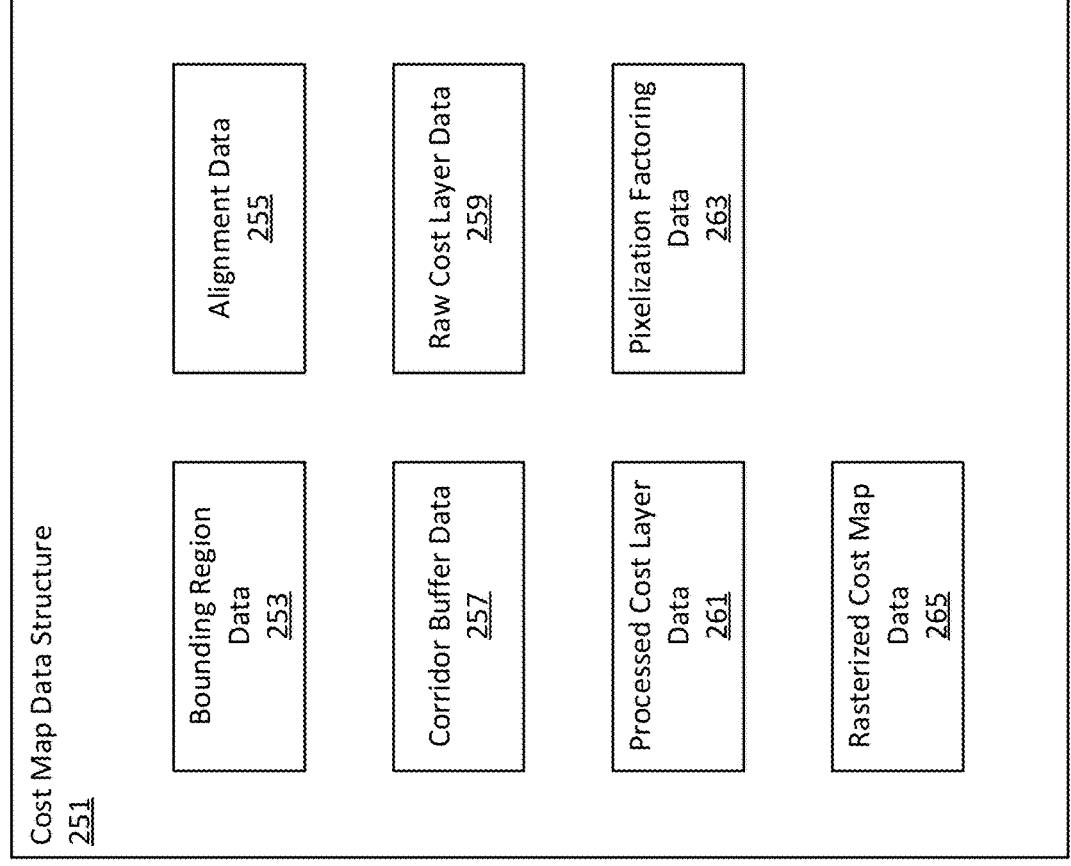

FIG. 2B is a block diagram illustrating a cost map data structure 251 and a cost layer data structure 267. The cost map data structure 251 comprises bounding region data 253, alignment data 255, corridor buffer data 257, raw cost layer data 259, processed cost layer data 261, pixelization factoring data 263, and rasterized cost map data 265. The cost layer data structure 267 comprises polygon-bounded area data 269 and polygon-bounded cost data 271.

The cost map data structure 251 is generally configured to encapsulate data relating to the 2-D cost maps as well as related metadata. The bounding region data 253 is generally configured to define a 2-D array that represents the search space as well as physical space beyond the search space. For example, a bounding region may be defined as an entire municipality in which an alignment is to be deployed. In one aspect, the 2-D grid is defined by latitude and longitude coordinates forming a bounding box.

The alignment data 255 is generally configured to represent one or more curves forming the alignment of a hyperloop corridor. The alignment data 255 is further configured to store additional metadata. For example, the alignment data 255 may comprise data that mathematically relates the curves to one another. For example, a first curve may be designed between the portals 115A, 115B, and a second curve may be designed between the portal 115B and the portal 115C—in which case the alignment data 255 stores the relationship between the first curve and the second curve in order to form a continuous alignment between the portals 115A, 115C.

In one aspect, the alignment data 255 may be initialized with an initial alignment in order to start subsequent operations relating to search space optimization. For example, initial alignment data may include a simple alignment within the bounding region. The simple alignment may be utilized to generate a corridor buffer that comprises the extents of the actual search space of the 1-D optimizer 231.

One of skill in the art will appreciate that the alignment is distinct from the profile. For the purposes of the disclosed solution, the alignment is of keen interest because the alignment generally defines where the profile will be deployed. In other words, the profile is generally configured to be overlaid on the ultimate alignment placement. Thus, the alignment data 255 may be updated and augmented to include additional data relating the alignment data 255 to any profile data (not shown). In one aspect, the alignment data 255 is augmented by the 1-D optimizer 231 such that profile data may readily be associated with the alignment data 255.

The corridor buffer data 257 is generally configured to define a corridor at or near the initial alignment, as stored in the alignment data 255. As stated, the alignment data 255 may comprise initial alignment data within the bounding region data 253. The bounding region data 253 generally relates to the larger extent of the search space and the corridor buffer data 257 is the more relevant areas of the search space. As such, the 1-D optimizer 231 is more efficient when determining optimized alignments (and even profiles). Thus, the initial alignment data forms the basis for corridor buffer data 257.

The raw cost layer data 259 is generally configured to store one or more layers containing cost-related data. For example, a parcel map may be included in a layer of the raw cost layer data 259 in order to demarcate the boundaries of various land parcels. Further, a land value map may be included as yet another layer of the raw cost layer data 259. As such, the cost map data structure 251 contains data sufficient to generate processed cost layer data 261, which is generally configured to provide the 1-D optimizer 231 the data for alignment optimization.

The processed cost layer data 261 is generally configured to store the raw cost layer data 259 after having been processed by the GIS management system 201 (and related processes). As stated, the 1-D optimizer 231 is configured to perform advanced search and AI techniques on the processed cost layer data 261 in order to optimize the alignment data 255 further.

The pixelization factoring data 263 is generally configured to store data relating to pixelization techniques used to fill in gaps in the raw cost layer data 259 and/or the processed cost layer data 261. Thus, the pixelization factoring data 263 is such that pixelization operations may be controlled, managed, observed, optimized, etc.

The rasterized cost map data 265 is generally configured to provide a 2-D array of data that represents the processed cost layer data 261. The rasterized cost map data 265 may be represented as a bitmap, in one aspect. Having the data represented in such a 2-D array provides consolidated data that the 1-D optimizer 231 may utilize to optimize the alignment data 255.

The cost layer data structure 267 is generally configured to store data relating to a real-world location. In general, the boundaries of the real-world locations are stored as polygons in the cost layer data structure 267. In one aspect, the raw cost layer data 259 and the processed cost layer data 261 utilize several cost layer data structures 267 in order to generate an optimized search space for consumption by the 1-D optimizer 231. In general, the cost layer data structure instances will be represented in the resulting rasterized cost map data 265.

The polygon-bounded area data 269 is generally configured to store a plurality of coordinates, lines, vectors, rays, etc., any of which form a polygon-bounded region related to the real-world deployment of an alignment. For example, a polygon-bounded area may be a parcel of land that is available for purchase. As another example, a polygon-bounded area may be a nature preserve that is not available for deployment of infrastructure.

The polygon-bounded cost data 271 generally contains data relating to the cost of the polygon-bounded area within the polygon-bounded area data 269. As stated, cost is not simply monetary values required to traverse the polygon-bounded area with an alignment. Cost may include other resources required for an alignment to traverse a polygon-bounded area. For example, the cost may include the number of liters of water required to pour concrete within the polygon-bounded area.

Figure 3A:
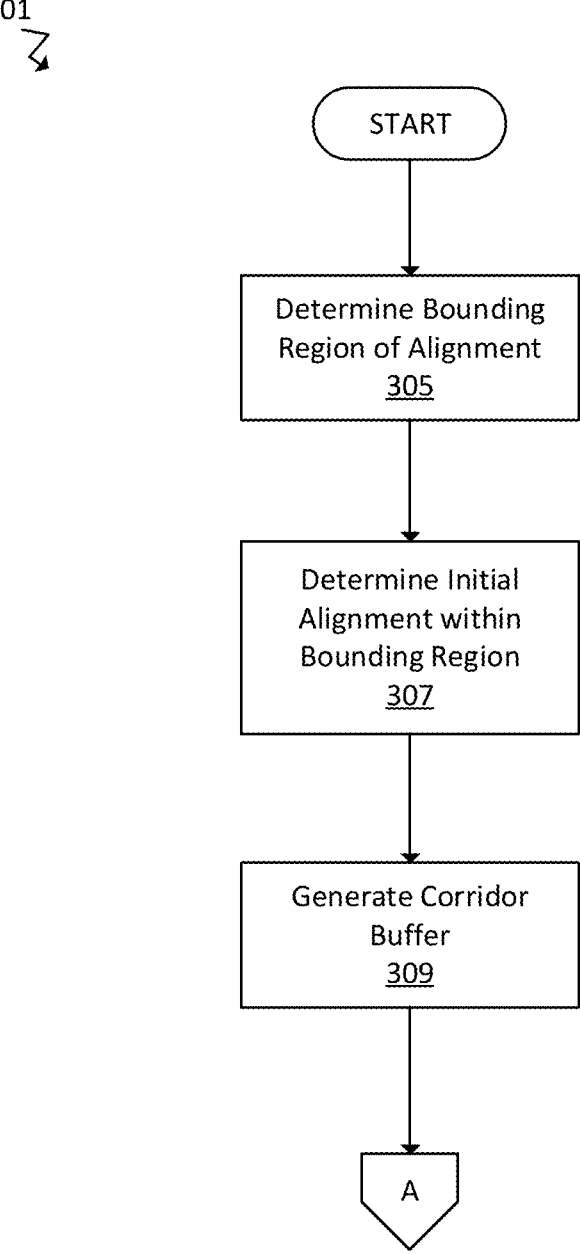
FIG. 3A is a flowchart illustrating a process for geospatial data gap filling.

FIG. 3A is a flowchart illustrating a process 301 for geospatial data gap filling. The process 301 is generally configured to process various data sources in order for the 1-D optimizer 231 to generate an optimized alignment. Specifically, the process 301 may be configured to utilize the cost map data structure 251 and the cost layer data structure 267 in order to generate rasterized cost map data 265. The process 301 begins at the start block and proceeds to block 305.

At the block 305, the process 301 determines the bounding region of the alignment. Any alignment is related to the real-world. As such, the process 301 defines a 2-D region upon which the alignment will be deployed. For example, the bounding region may be associated with the boundaries of a state. Therefore, the process 301 defines the outer limits of the search space by setting the bounding region data 253 as the borders of the state. The process 301 then proceeds to block 307.

At the block 307, the process 301 determines the initial alignment within the bounding region. The process 301 sets the alignment data 255 with one or more alignment curves that form an initial alignment within the bounding region (stored in the bounding region data 253). Therefore, the initial alignment may be any alignment conceivable within the bounding region. Such flexibility offers users opportunities to initialize the alignment based on real-world constraints. For example, a human user may be a hyperloop operator deploying a route between the portals 115C, 115D. As such, the user knows roughly how the route should be deployed, though the user does not possess the details of the detailed data informing the deployment.

In general, the initial alignment is not optimized. Whether generated by human users or automated systems, the initial alignment is a rough estimate of where the alignment will be deployed within the bounding region. Upon further processing, the initial alignment will be optimized for consumption by the 1-D optimizer 231. The process 301 then proceeds to block 309.

At the block 309, the process 301 generates a corridor buffer. The corridor buffer is associated with the initial alignment. In one aspect, the corridor buffer may be generated by using radii extended from points along the initial alignment. In another aspect, the corridor buffer may be generated by using point distribution. One of skill in the art will appreciate that the corridor buffer may be determined using a number of techniques; however, the corridor buffer should be configured such that the search space for optimizations is smaller than the entire bounding region.

Figure 3B:
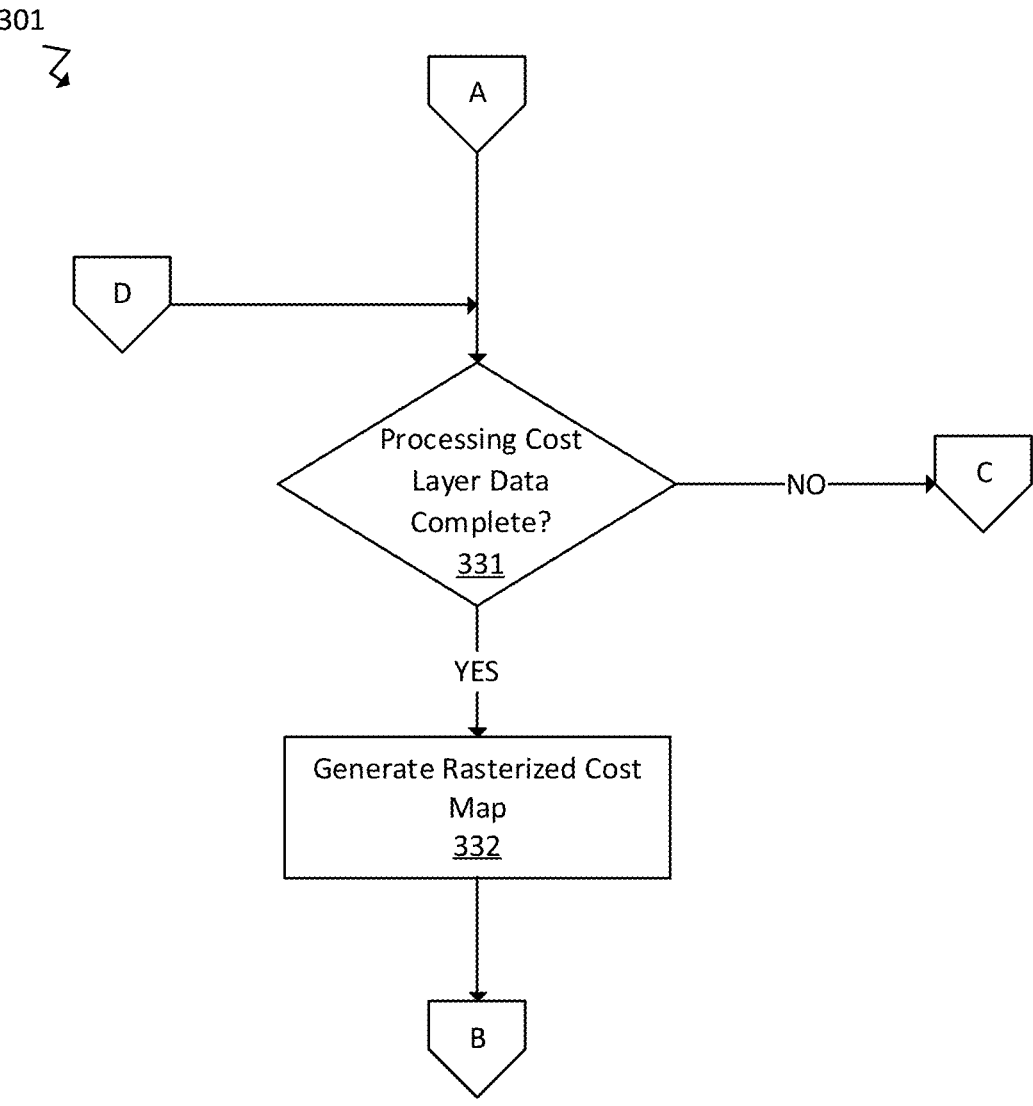
FIG. 3B is a flowchart illustrating a process for geospatial data gap filling.

FIG. 3B is a flowchart illustrating the process 301 for geospatial data gap filling. The process 301 continues at off-page reference A and proceeds to decision block 331.

At the decision block 331, the process 301 determines whether the processing of cost layer data is complete. If the processing is not complete, the process 301 proceeds along the NO branch to off-page reference C (which continues at FIG. 3C). If the processing is complete, the process 301 proceeds along the YES branch to block 332.

At the block 332, the process 301 generates a rasterized cost map. The rasterized cost map is a 2-D plurality of values associated with costs to traverse. Thus, the rasterized cost map informs the 1-D optimizer 231 what the various costs are along the corridor buffer. For example, an initial alignment may be evaluated based on raw cost layer data 259 that is then transformed into processed cost layer data 261. Once the processed cost layer data 261 is determined, the data layers are combined to form the rasterized cost map data 265. The rasterized cost map data 265 is later used by the 1-D optimizer 231 to generate an optimized alignment (e.g., as stored in the alignment data 255). The process 301 then proceeds to off-page reference B.

Returning to the decision block 331, if the processing of the cost layer data is not complete, the process 301 proceeds along the NO branch to the off-page reference C, as previously stated. One of skill in the art will note that off-page reference D is positioned before the decision block 331. As such, off-page reference D is utilized to show that the process 301 may iteratively (or recursively) process cost layer data until a completeness is determined and satisfied at the decision block 331. As such, FIG. 3B and FIG. 3C are closely related.

Figure 3C:
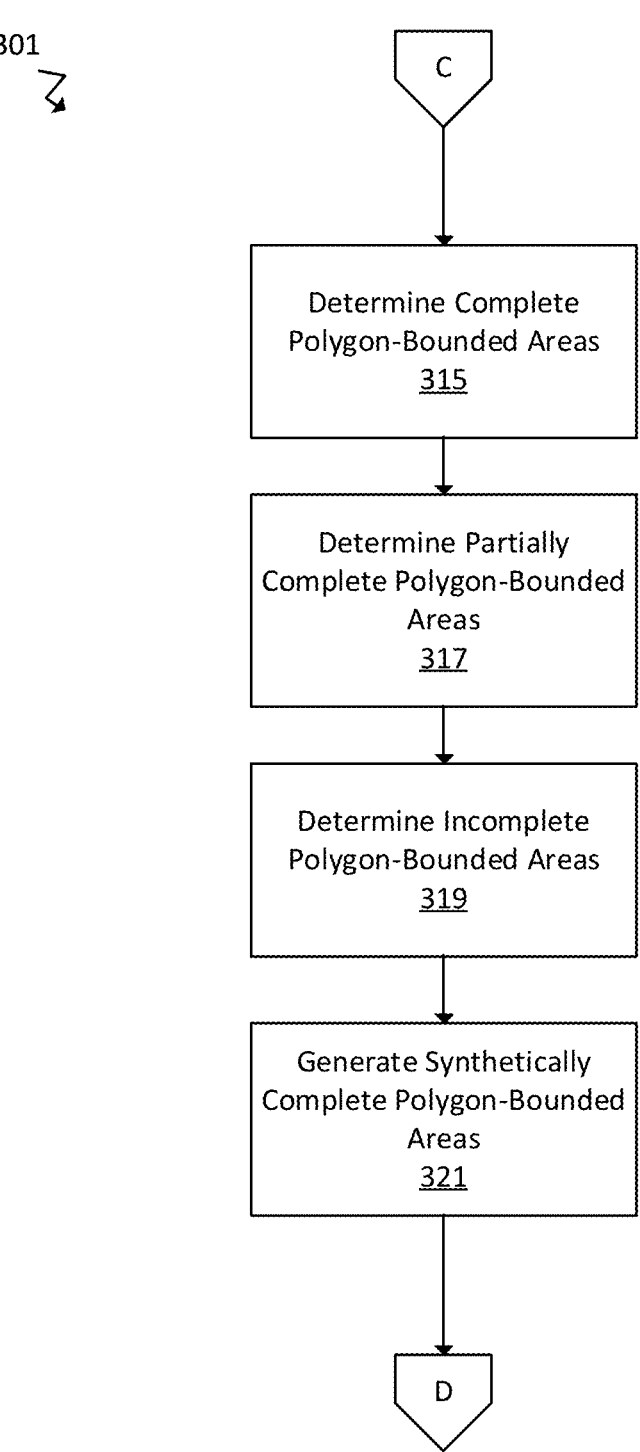
FIG. 3C is a flowchart illustrating a process for geospatial data gap filling.

FIG. 3C is a flowchart illustrating the process 301 for geospatial data gap filling. The process 301 continues from the off-page reference C, which originated at FIG. 3B above. The process 301 then proceeds to block 315.

At the block 315, the process 301 determines the completeness of the polygon-bounded areas. The cost map data structure 251 comprises raw cost layer data 259 that may be complete, partially complete, or wholly incomplete. As such, the process 301 is configured to fill in the data gaps for partially complete and/or incomplete polygon-bounded areas. Table 1A below shows raw cost layer data 259 having at least three cost layer data structures 267 associated with a number of polygon-bounded areas (FIG. 4C, 415A, 415B, 415D, 415E).

values and improvement values (e.g., buildings). As shown in Table 1A above, the total land value is the summation of the land value and the improvement value.

In one aspect, the values of Table 1A may be associated with an instance of the cost layer data structure 267. Further, the polygon coordinates may be stored in an instance of the polygon-bounded area data 269. Still further, the land value and the improvement value may be stored in the polygon-bounded cost data 271. As such, the cost layer data structure 267 may store the data of Table 1A in the raw cost layer data 259. However, the processed cost layer data 261 is uninitialized because the process 301 has not determined the existing completeness or started the operations of reaching full and/or synthetic completeness.

In general, the GIS data may be incomplete, partially complete, or complete. As shown in Table 1A, the polygon-bounded area 415A is fully complete. Further, the polygon-bounded areas 415B, 415D, 415E are partially complete. The process 301 then proceeds to block 317.

At the block 317, the process 301 determines the partial completeness of the polygon-bounded areas. As shown in Table 1A, the polygon-bounded areas 415B, 415E are partially complete. The process 301 then proceeds to block 319.

At the block 319, the process 301 determines the incompleteness of the polygon-bounded areas. As shown in Table 1A, the polygon-bounded area 415D is incomplete. The process 301 then proceeds to block 321.

At the block 321, the process 301 generates synthetic completeness of the polygon-bounded areas. The process 301 then proceeds to the off-page reference D which continues at FIG. 3B, as previously stated. One of skill in the art will appreciate that the process 301 may iteratively (or recursively) determine the states of the polygon-bounded areas. Further, the process 301 may leverage previous determinations and operations to inform current determinations of completeness as well as generate synthetic completeness of the polygon-bounded areas.

TABLE 1A

| Polygon-Bounded Area | Polygon Coordinates | Land Value | Improvement Value | Total Value |
|---|---|---|---|---|
| 415A | A(4.5, 2.7), B(4.82, 2.7), C(4.76, 2.62), D(4.5, 2.54) | $150,000 | $72,000 | $222,000 |
| 415B | A(4.82, 2.66), B(4.82, 2.7), C(5.18, 2.7), D(5.16, 2.42), | $110,000 | $99,000 | NULL |
| 415D | A(4.5, 2.54), B(4.76, 2.62), C(4.78, 2.52), D(4.5, 2.45) | $ 0 | $ 0 | $ 0 |
| 415E | A(4.76, 2.62), B(4.78, 2.64), C(4.82, 2.66), D(4.94, 2.52), E(4.8, 2.46) | $ 98,000 | $ 0 | $ 98,000 |

Figure 4A:
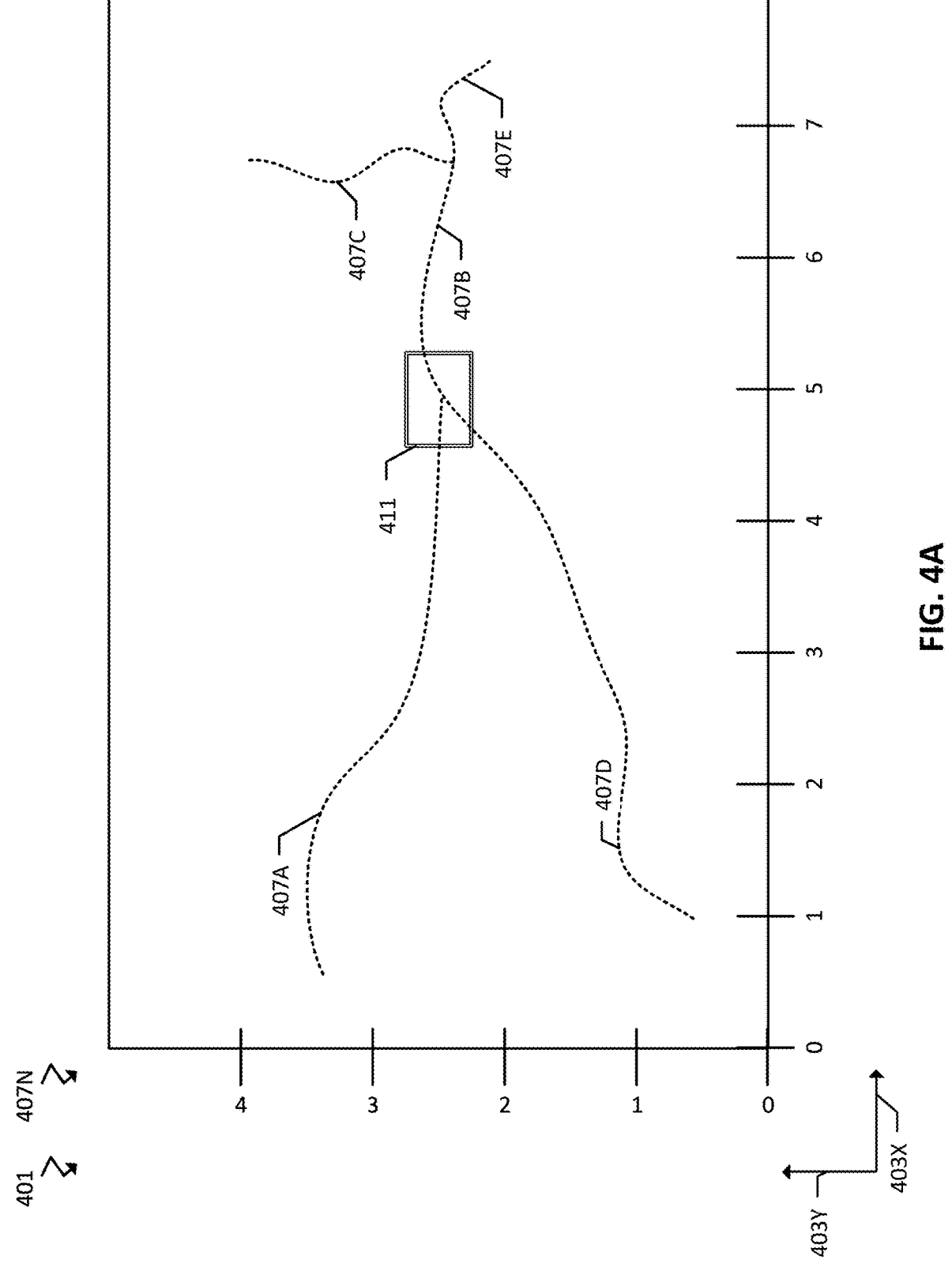
FIG. 4A is a block diagram illustrating a bounding region.
Figure 4B:
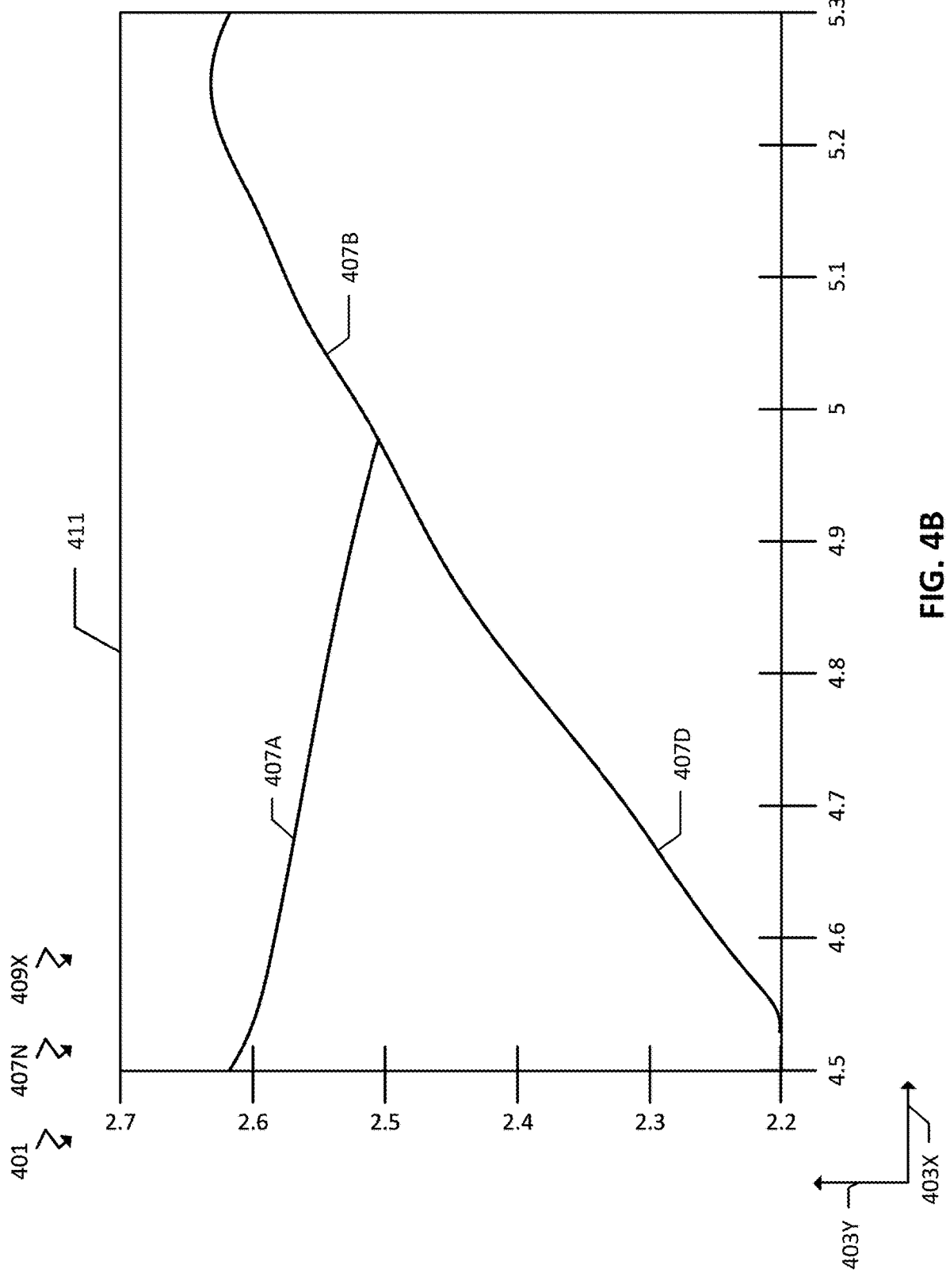
FIG. 4B is a block diagram illustrating a bounding subregion.
Figure 4C:
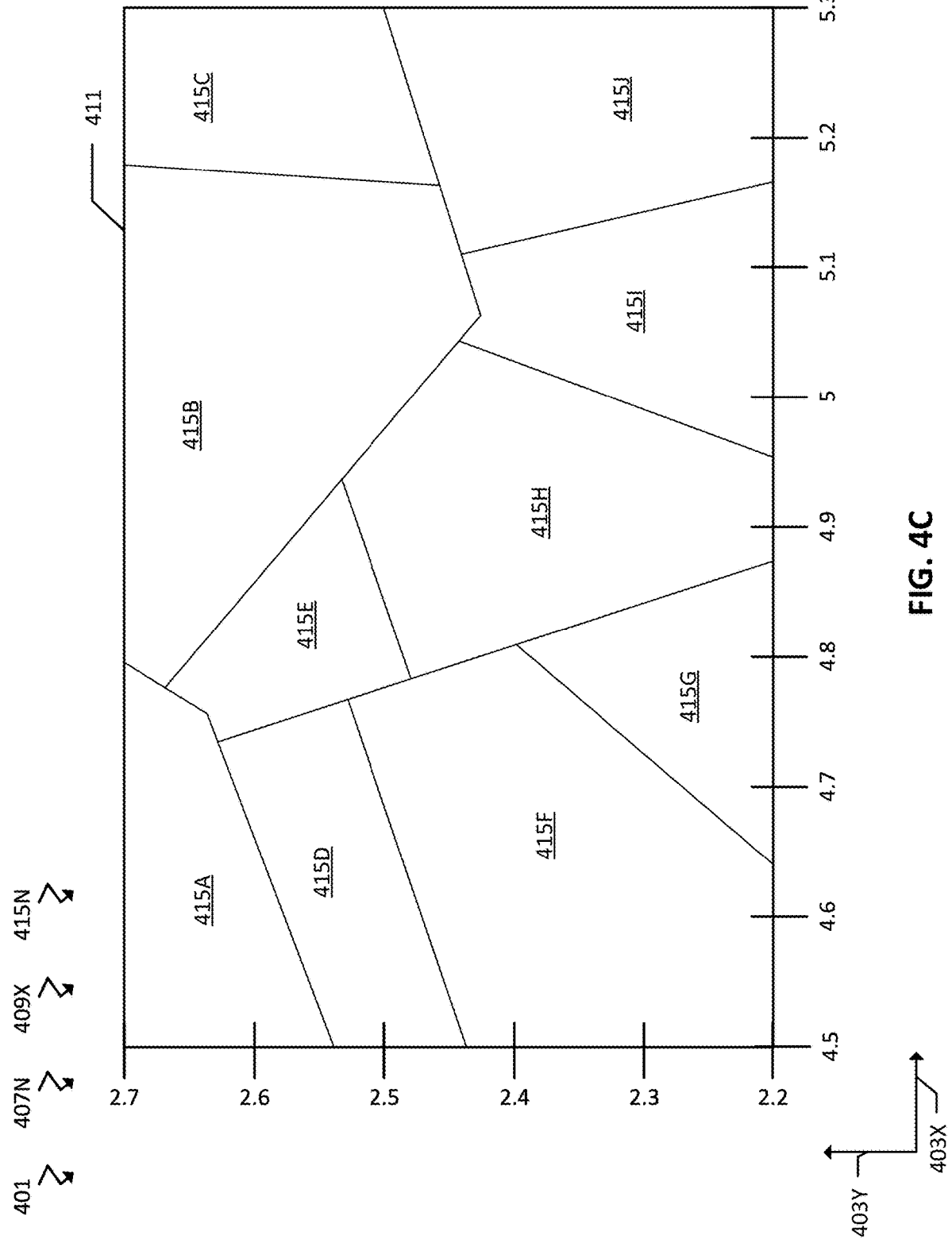
FIG. 4C is a block diagram illustrating a bounding subregion.

Example Data for Cost Data Layer Structures Associated with Polygon-Bounded Areas 415A, 415B, 415D, 415E (FIG. 4C)

According to one aspect, the data of Table 1A is processed to generate normalized cost data. In a table of polygons, the area of a given polygon is one of the polygon's fundamental key properties that is always present. In one aspect, the cost per square meter or per square kilometer may be considered, depending on the data to be normalized.

Figure 3D:
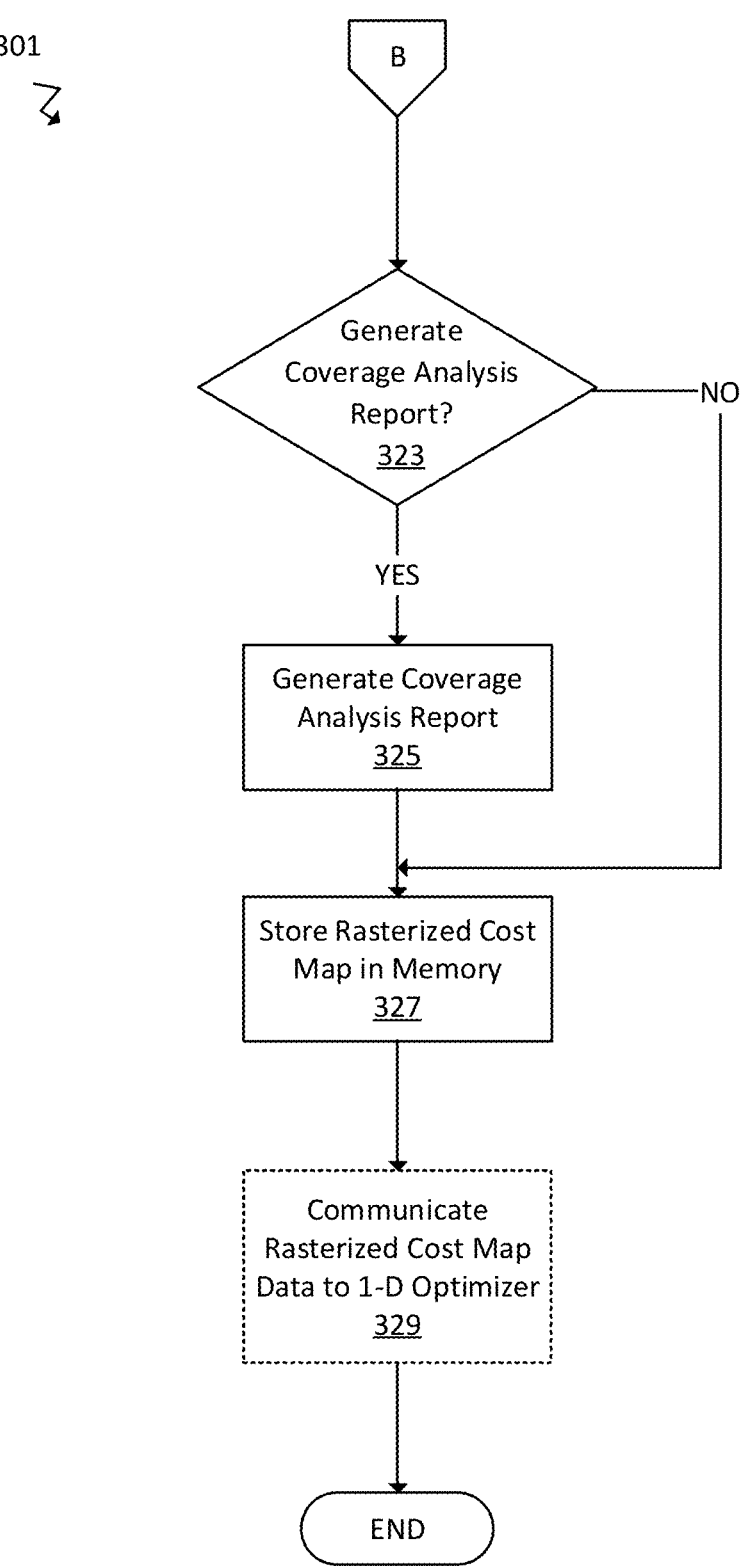
FIG. 3D is a flowchart illustrating a process for geospatial data gap filling.

The polygon-bounded areas in Table 1A are associated with four polygon-bounded areas 415A, 415B, 415D, a 415E. The polygon-bounded areas 415A, 415B, 415D, 415E are discussed in more detail below at FIG. 4C. For the purposes of the instant example, the polygon-bounded areas 415A, 415B, 415D, 415E are parcels having both land FIG. 3D is a flowchart illustrating the process 301 for geospatial data gap filling. The process 301 continues from the off-page reference B, which originated at FIG. 3B above. The process 301 proceeds to decision block 323.

At the decision block 323, the process 301 determines whether the coverage analysis report 225 should be generated. In one aspect, the coverage analysis report 225 may be displayed on a user terminal for stakeholders to evaluate results of the process 301. If it is determined that the coverage analysis report 225 should not be generated, the process 301 proceeds along the NO branch to block 327. If it is determined that the coverage analysis report 225 should be generated, the process 301 proceeds along the YES branch to block 325.

At the block 325, the process 301 generates the coverage analysis report 225. The coverage analysis report 225 is of particular use to human users because the coverage analysis report 225 may be formatted as human-readable. Thus, the human user may then review the operations and results of the process 301. The process 301 then proceeds to the block 327.

At the block 327, the process 301 stores the rasterized cost map in memory. The process 301 then proceeds to block 329.

At optional block 329, the process 301 communicates the rasterized cost map data 265 to the 1-D optimizer 231. The 1-D optimizer 231 will then perform optimizations based on the rasterized cost map data 265 in order to generate an optimized instance of the alignment data 255. The process 301 then proceeds to the end block and terminates.

FIG. 4A is a block diagram illustrating a bounding region 401. The bounding region 401 is generally associated with a real-world location that is stored in the bounding region data 253. Two pluralities of references are disposed along an axis 403X and an axis 403Y, respectively.

The bounding region 401 comprises a plurality of alignment curves 407N. The alignment curves 407N comprises a first alignment curve 407A, a second alignment curve 407B, a third alignment curve 407C, a fourth alignment curve 407D, and a fifth alignment curve 407E. As shown, the alignment curves 407N are connected such that the hyperloop vehicle 110 may traverse most of the bounding region 401. Thus, the alignment curves 407N may correspond to an initial alignment as described in FIG. 3A above. As such, the alignment curves 407N may be stored in the alignment data 255 for processing by the process 301 and the associated GIS management system 201.

The alignment curves 407N are potentially traversable by the hyperloop vehicle 110, in one aspect. As shown, the 1-D optimizer 231 has not performed operations on the alignment curves 407N, thus the hyperloop vehicle 110 may have a number of operating issues when actually attempting traversal of the alignment curves 407N. For example, the alignment curves 407A, 407D may intersect at the coordinates (4.9, 2.5) in such a manner that the hyperloop vehicle 110 is physically unable to proceed along the alignment curve 407B. Even if the alignment is satisfactory, the profile may be completely undefined.

A bounding subregion 411 is shown. The bounding subregion 411 is for the purposes of reference in subsequent figures. However, the bounding subregion 411 is depicted such that the bounding subregion 411 will be positioned completely within any associated corridor buffer.

FIG. 4B is a block diagram illustrating the bounding subregion 411. The bounding subregion 411 is completely within the bounding region 401. A plurality of corridor buffers 409X is formed by the corridor buffers 409A, 409B. For the instant view, the nature of the buffer is less important than the fact that the bounding subregion 411 is within the corridor buffers 409X. Further, the bounding subregion 411 is prepared for rasterization operations performed by the process 301.

FIG. 4C is a block diagram illustrating the bounding subregion 411. The instant view illustrates how various areas of land may be processed by the disclosed solution, specifically with reference to the GIS management system 201 and the process 301. As shown, the bounding subregion 411 comprises a plurality of polygon-bounded areas 415N. The polygon-bounded areas 415N comprise a first polygon-bounded area 415A, a second polygon-bounded area 415B, a third polygon-bounded area 415C, a fourth polygon-bounded area 415D, a fifth polygon-bounded area 415E, a sixth polygon-bounded area 415F, a seventh polygon-bounded area 415G, an eighth polygon-bounded area 415H, a ninth polygon-bounded area 415I, and a tenth polygon-bounded area 415J.

Each of the polygon-bounded areas within the plurality of polygon-bounded areas 415N is associated with a cost layer data structure 267 instance. Table 1A above and the associated description provide examples of how the data of the bounding subregion 411 would be represented in memory. The polygon-bounded areas 415N may have polygon-bounded area data 269 instantiated with 2-D coordinates forming a polygon (as shown in Table 1A above). Further, the polygon-bounded cost data 271 may be instantiated with the land value and improvements value (as shown in Table 1A above). The process 301 shall be described with reference to the following figures showing the solution operating on hypothetical data.

Figure 4D:
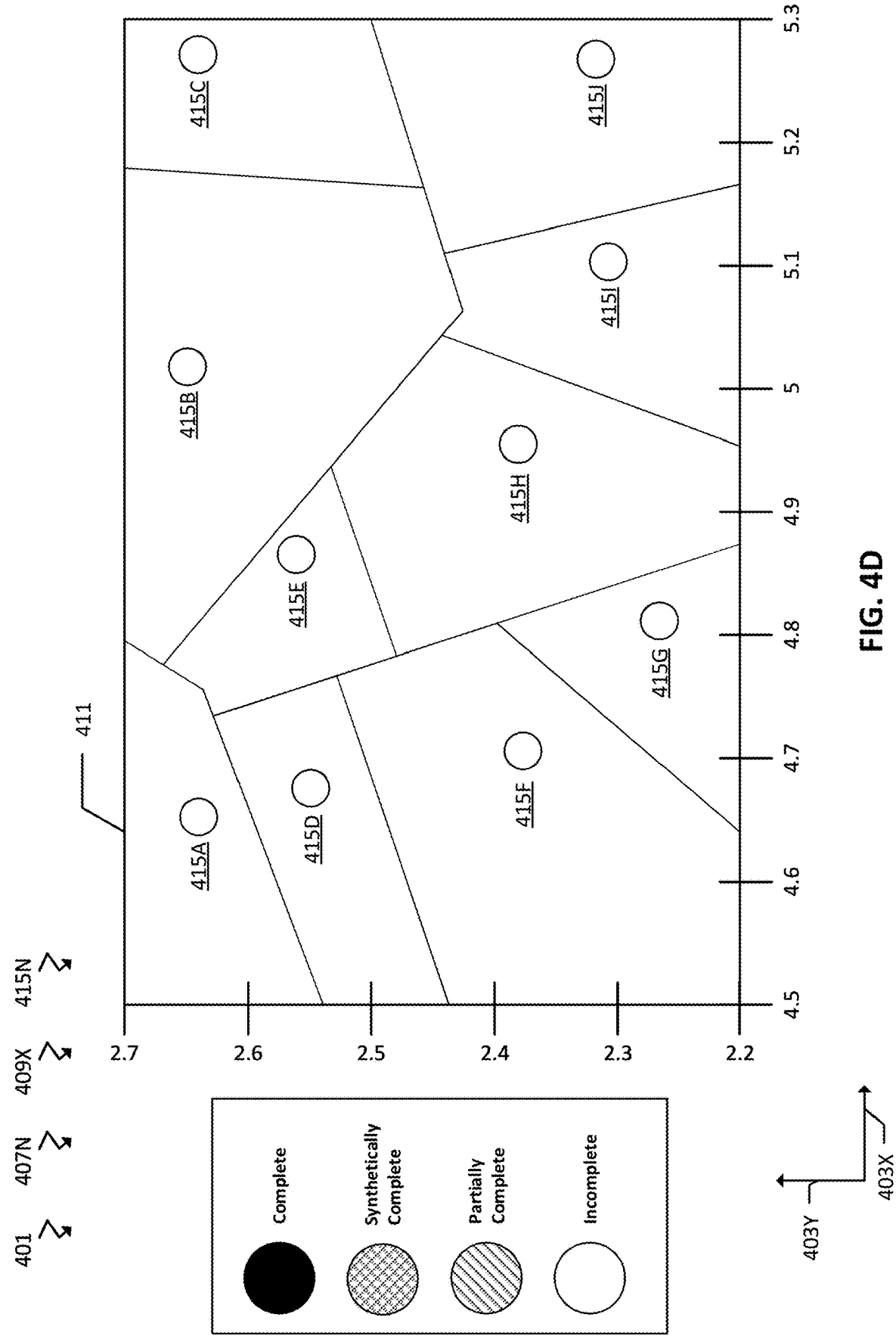
FIG. 4D is a block diagram illustrating a bounding subregion.

FIG. 4D is a block diagram illustrating the bounding subregion 411. The plurality of polygon-bounded areas 415N is incomplete. As shown in the instant view, the process 301 has performed the operations associated with the block 315.

Figure 4E:
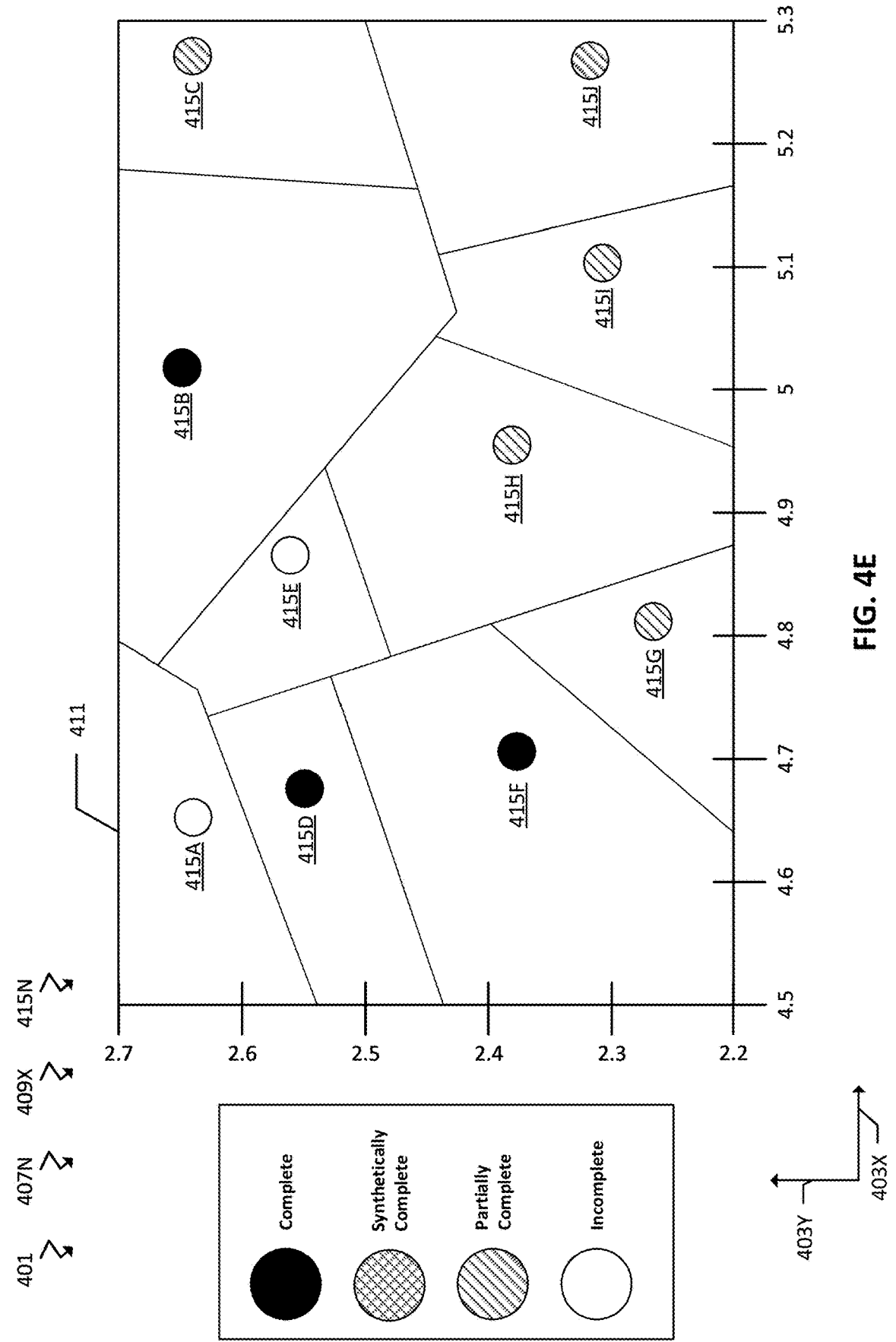
FIG. 4E is a block diagram illustrating a bounding subregion.

FIG. 4E is a block diagram illustrating the bounding subregion 411. The plurality of polygon-bounded areas 415N is shown having a mixture of complete polygon-bounded areas, partially complete polygon-bounded areas, and incomplete polygon-bounded areas. The polygon-bounded areas 415A, 415E are incomplete. The polygon-bounded areas 415C, 415G, 415H, 415I, 415J are partially complete. The polygon-bounded areas 415B, 415D, 415F are complete. The polygon-bounded areas 415A, 415E are incomplete.

As shown in the instant view, the operations of the blocks 317, 319 have been completed by the process 301. At this point in time, the process 301 is prepared to synthetically complete the incomplete and/or partially complete polygon-bounded areas (e.g., the polygon-bounded areas 415A, 415H).

Figure 4F:
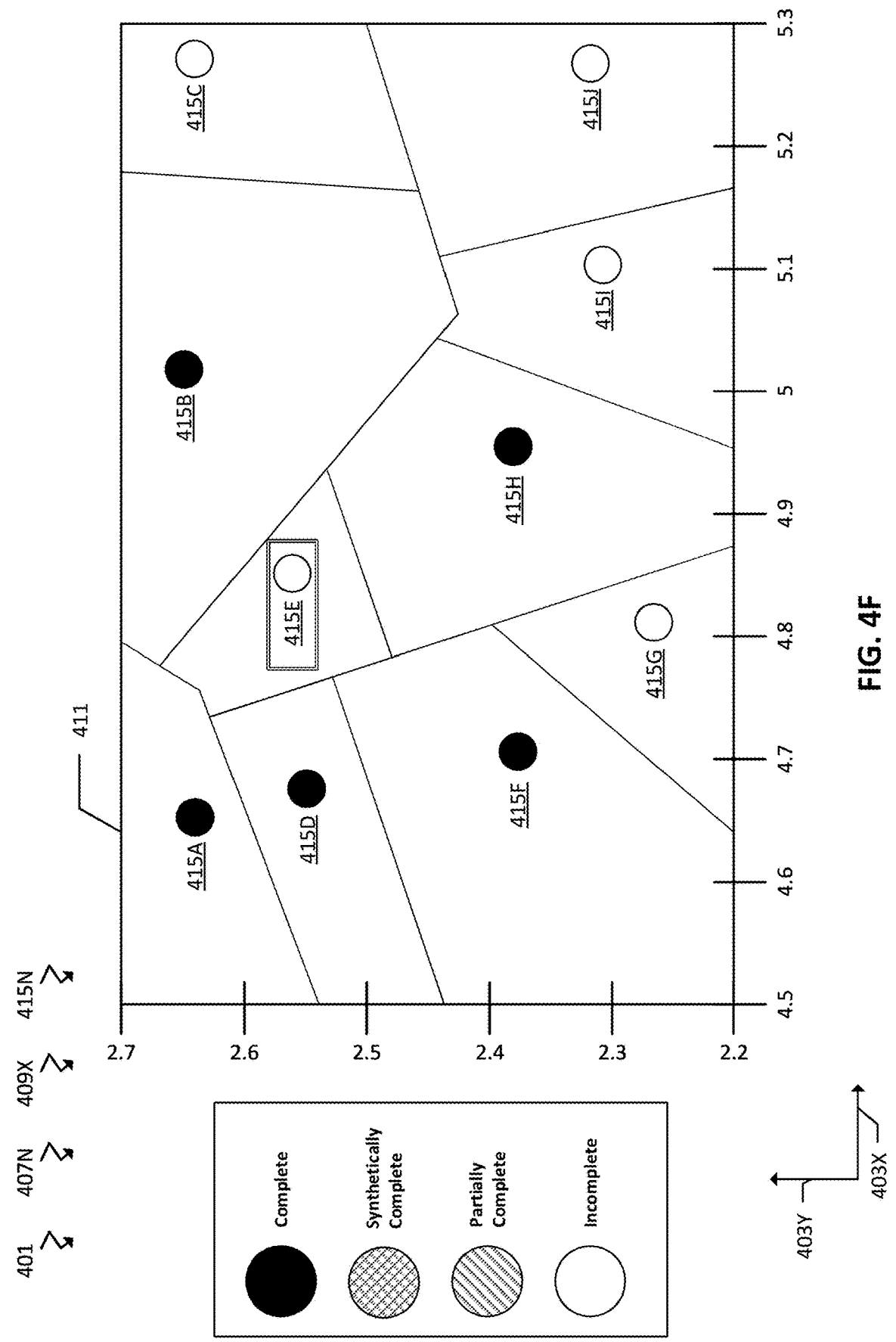
FIG. 4F is a block diagram illustrating a bounding subregion.

FIG. 4F is a block diagram illustrating the bounding subregion 411. The plurality of polygon-bounded areas 415N is shown having a mixture of complete polygon-bounded areas and incomplete polygon-bounded areas in order to show how the polygon-bounded area 415E may become synthetically complete via use of the process 301. The polygon-bounded areas 415C, 415E, 415G, 415I, 415J are incomplete. The polygon-bounded areas 415A, 415B, 415D, 415F, 415H are complete.

As shown, the polygon-bounded area 415E is adjacent to only those polygon-bounded areas that are complete (e.g., the polygon-bounded area 415A). As such, the process 301 will start the operations at the block 321 in order to synthetically complete the polygon-bounded area 415E.

Figure 4G:
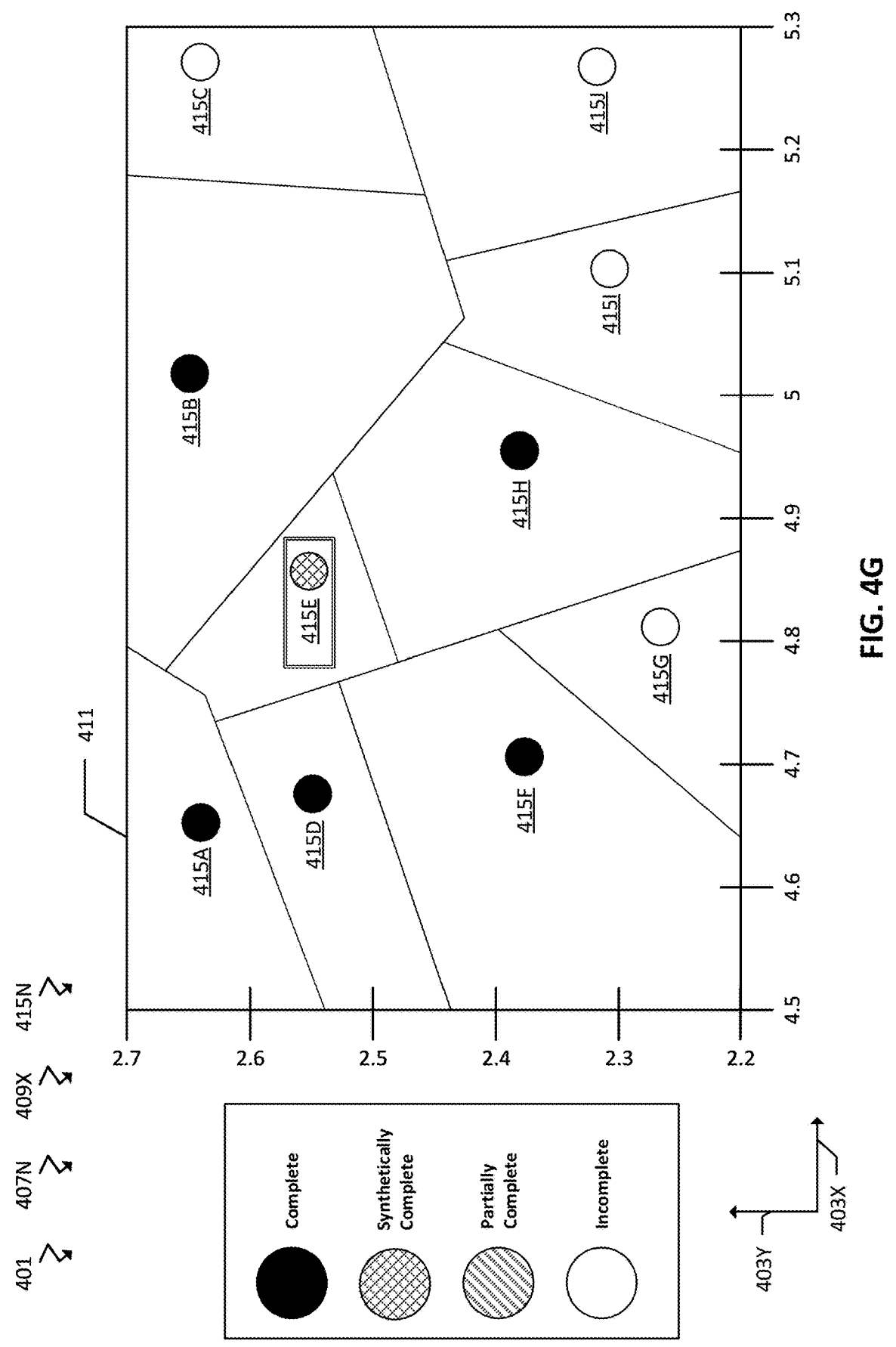
FIG. 4G is a block diagram illustrating a bounding subregion.

FIG. 4G is a block diagram illustrating the bounding subregion 411. The plurality of polygon-bounded areas 415N is shown having a mixture of complete polygon-bounded areas and incomplete polygon-bounded areas in order to show how the polygon-bounded area 415E may become synthetically complete via use of the process 301. As shown, the polygon-bounded area 415E is now synthetically complete via the process 301. The polygon-bounded areas 415C 415G, 415I, 415J are still incomplete. The polygon-bounded areas 415A, 415B, 415D, 415F, 415H are still complete.

At this point in time, the process 301 proceeds to the off-page reference D (at FIG. 3C). Further, the process 301 will proceed to synthetically complete other incomplete polygon-bounded areas. For example, the polygon-bounded area 415G is still incomplete and will be synthetically completed via the process 301 at the block 321.

Figure 4H:
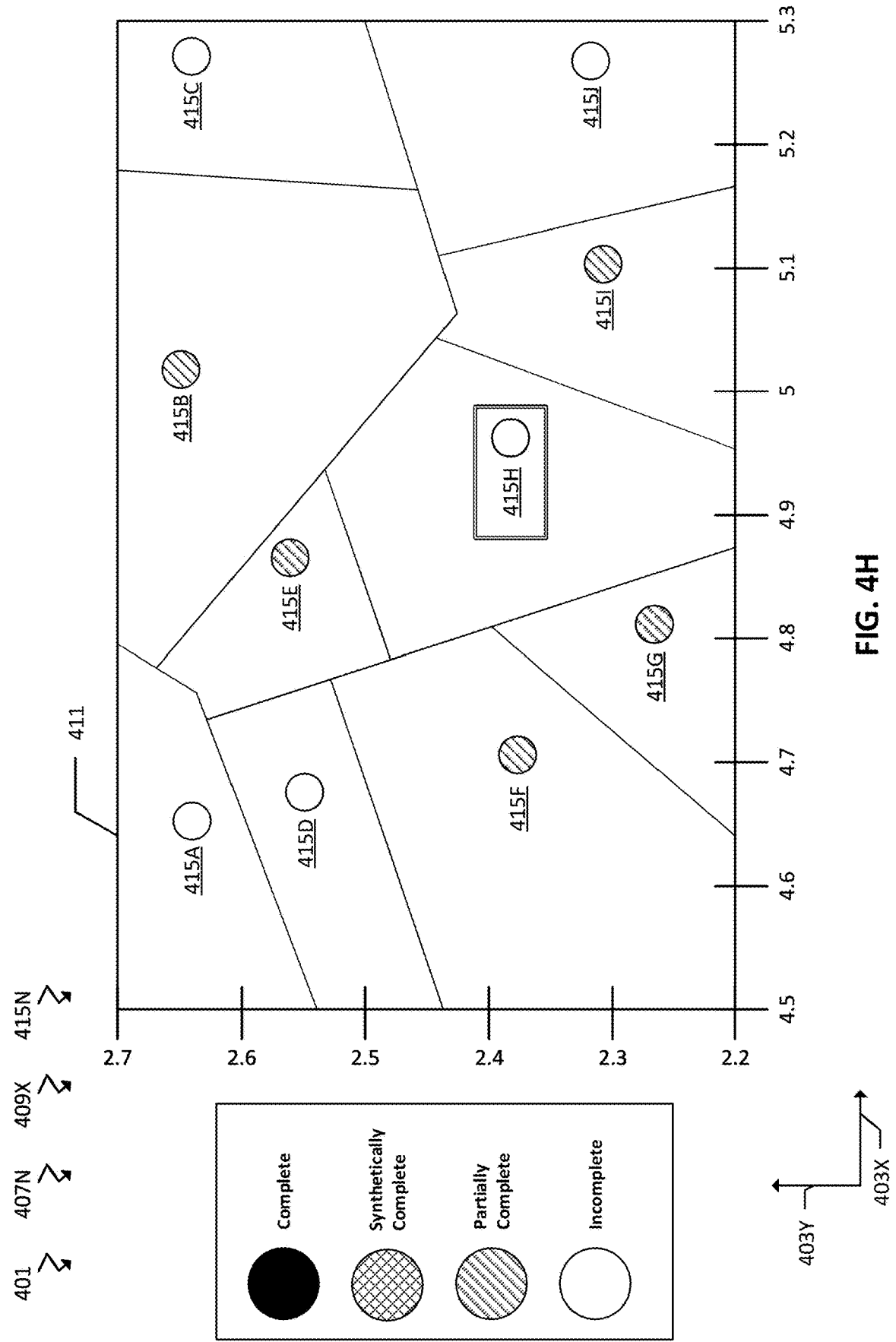
FIG. 4H is a block diagram illustrating a bounding subregion.

FIG. 4H is a block diagram illustrating the bounding subregion 411. The plurality of polygon-bounded areas 415N is shown having a mixture of partially complete polygon-bounded areas and incomplete polygon-bounded areas in order to show how the polygon-bounded area 415H may become synthetically complete via use of the process 301. The polygon-bounded areas 415A, 415C, 415D, 415H, 415J are incomplete. The polygon-bounded areas 415B, 415E, 415F, 415G, 415I are partially complete.

As shown, the polygon-bounded area 415H is adjacent to only those polygon-bounded areas that are partially complete (e.g., the polygon-bounded area 415G). As such, the process 301 will start the operations at the block 321 in order to synthetically complete the polygon-bounded area 415H.

Figure 4I:
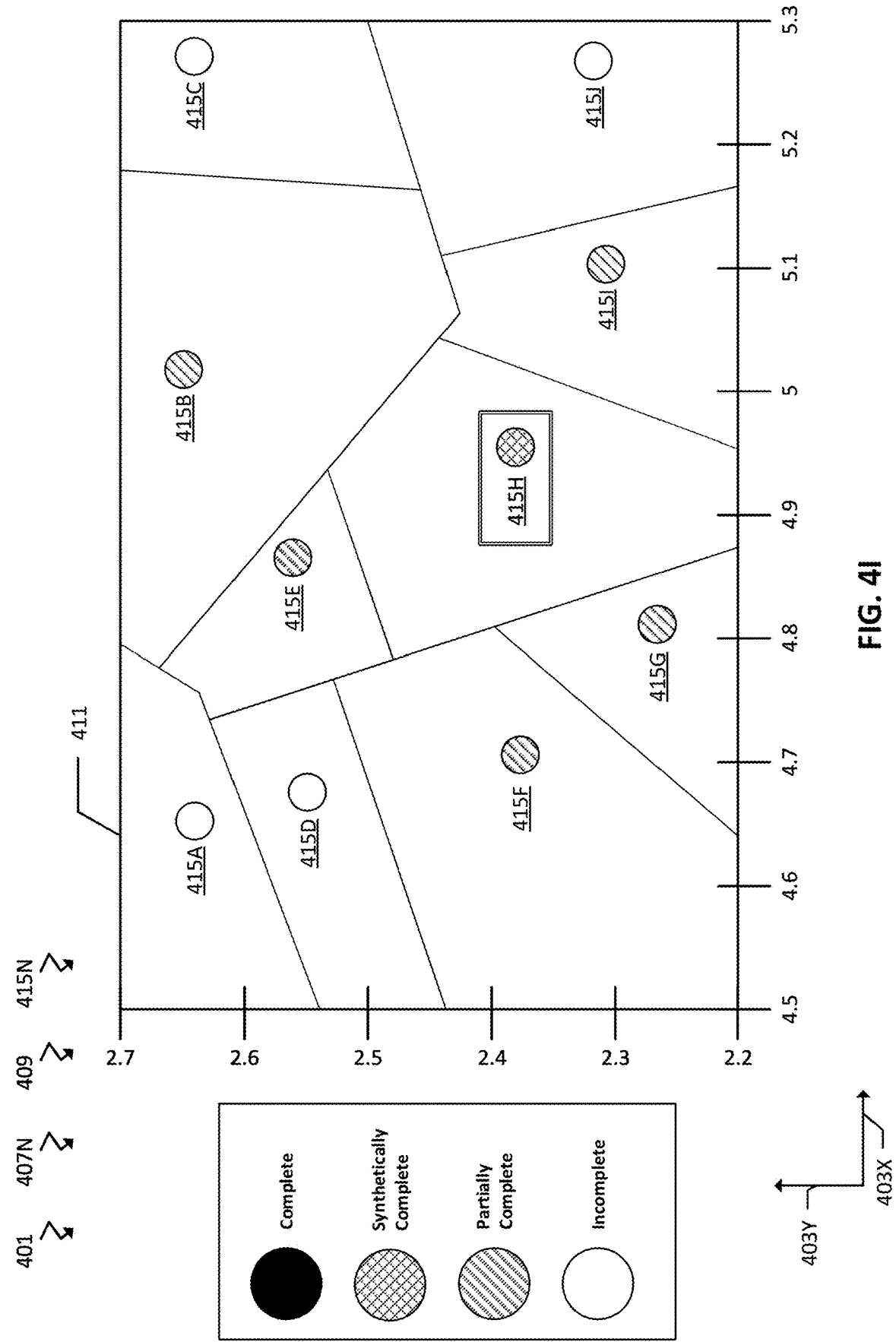
FIG. 4I is a block diagram illustrating a bounding subregion.

FIG. 4I is a block diagram illustrating the bounding subregion 411. The plurality of polygon-bounded areas 415N is shown having a mixture of partially complete polygon-bounded areas, incomplete polygon-bounded areas, and a newly synthetically complete polygon-bounded area. The polygon-bounded area 415H is shown as synthetically complete. The polygon-bounded areas 415A, 415C, 415D, 415J remain incomplete. The polygon-bounded areas 415B, 415E, 415F, 415G, 415I remain partially complete.

At this point in time, the process 301 proceeds to the off-page reference D (at FIG. 3C). Further, the process 301 will proceed to synthetically complete other incomplete polygon-bounded areas. For example, the polygon-bounded area 415J is still incomplete and will be synthetically completed via the process 301 at the block 321.

Figure 4J:
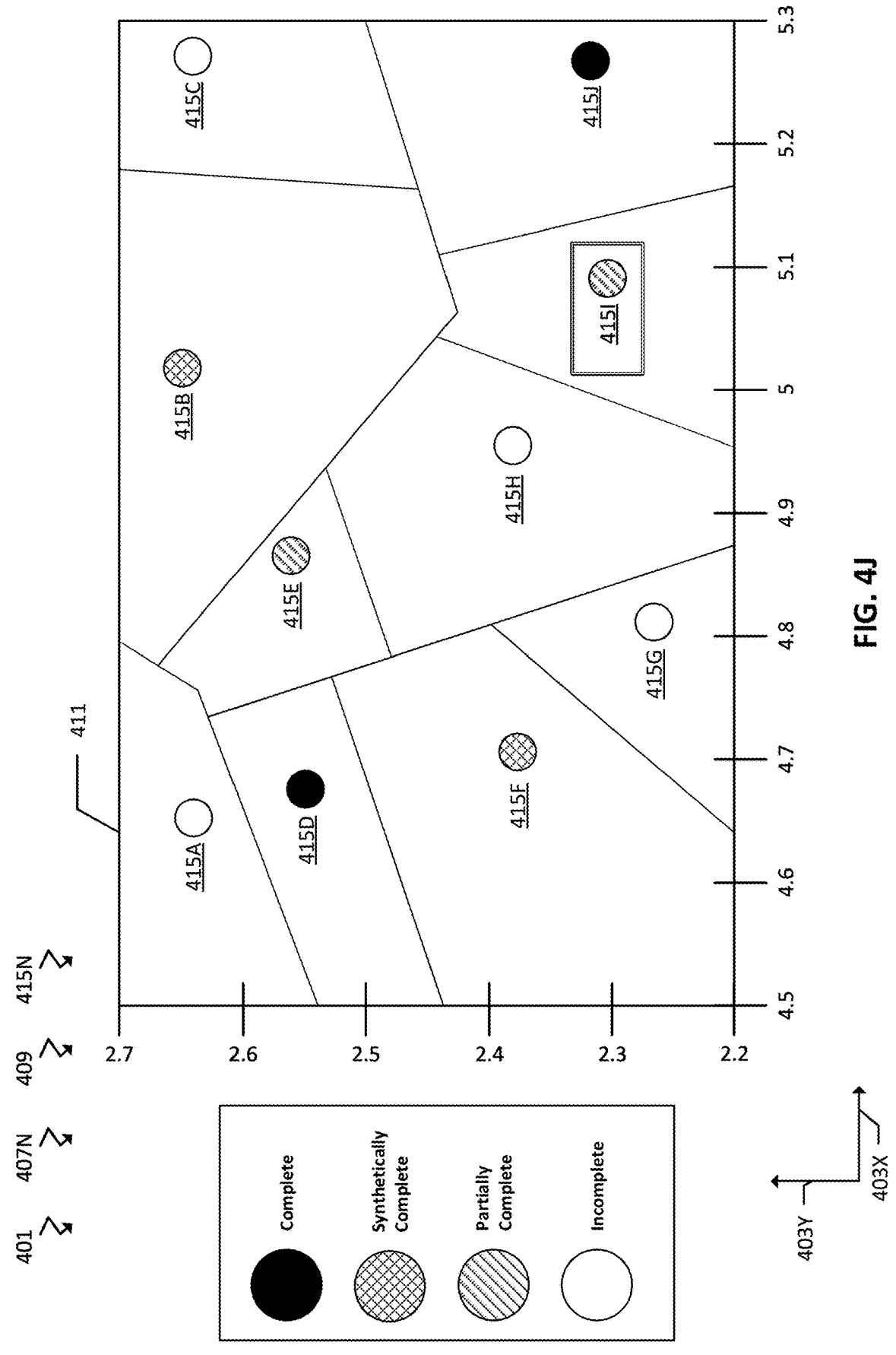
FIG. 4J is a block diagram illustrating a bounding subregion.

FIG. 4J is a block diagram illustrating the bounding subregion 411. The plurality of polygon-bounded areas 415N is shown having a mixture of complete polygon-bounded areas, partially complete polygon-bounded areas, incomplete polygon-bounded areas, and synthetically complete polygon-bounded areas in order to show how the polygon-bounded area 415I may become synthetically complete via use of the process 301. The polygon-bounded areas 415A, 415C, 415G, 415H are incomplete. The polygon-bounded areas 415E, 415I are partially complete. The polygon-bounded areas 415D, 415J are complete. Lastly, the polygon-bounded areas 415B, 415F are synthetically complete.

As shown, the polygon-bounded area 415I is adjacent to various states of completeness. Specifically, the polygon-bounded areas 415C, 415H are adjacent and incomplete. The polygon-bounded area 415E is adjacent and partially complete. The polygon-bounded area 415B is synthetically complete. Lastly, the polygon-bounded area 415J is adjacent and complete. As such, the process 301 will start the operations at the block 321 in order to synthetically complete the polygon-bounded area 415I. Therefore, the process 301 is configured to address a plurality of states at once including incomplete, partially complete, synthetically complete, and complete.

Figure 4K:
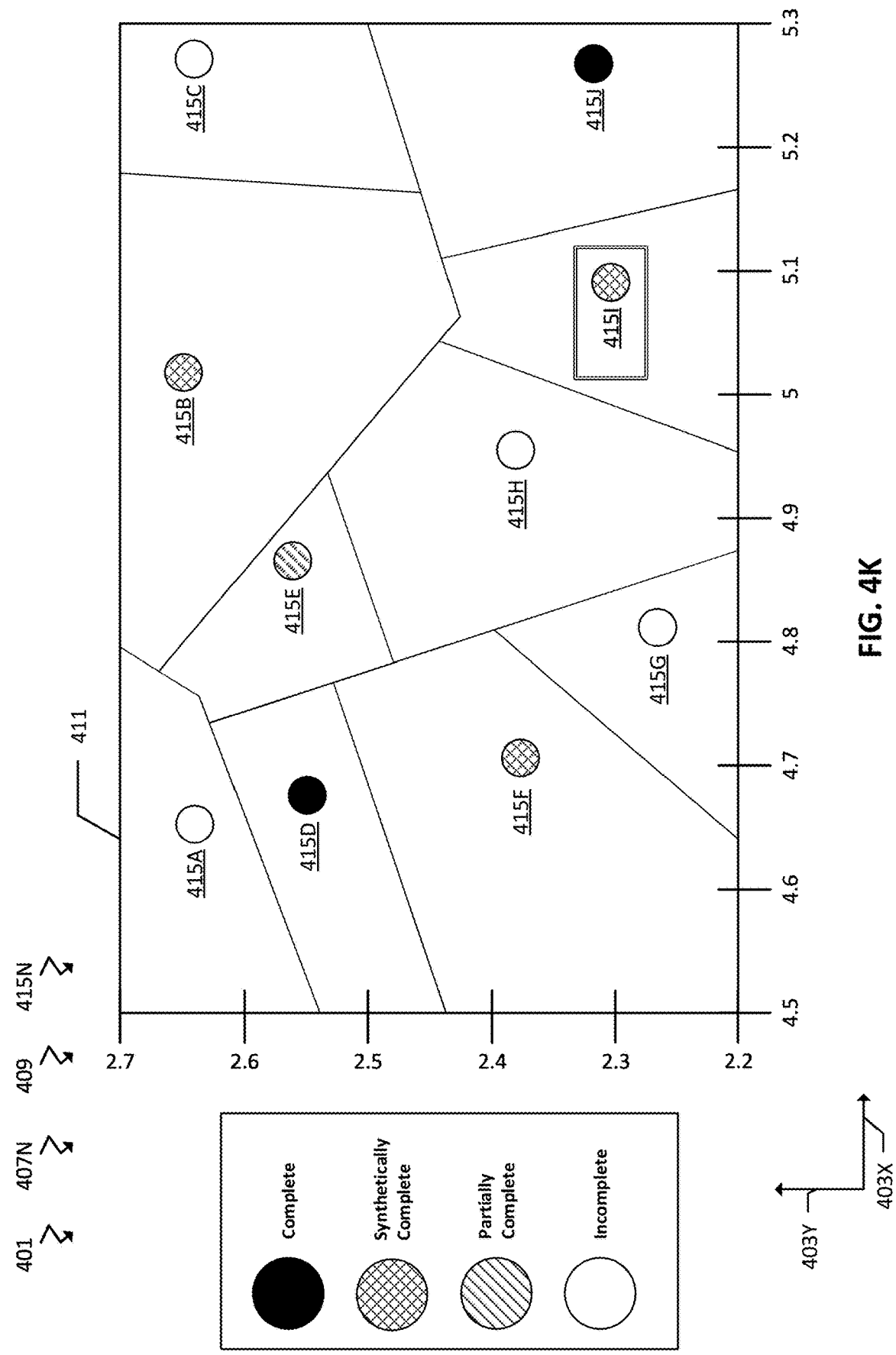
FIG. 4K is a block diagram illustrating a bounding subregion.

FIG. 4K is a block diagram illustrating the bounding subregion 411. The plurality of polygon-bounded areas 415N is shown having a mixture of complete polygon-bounded areas, partially complete polygon-bounded areas, incomplete polygon-bounded areas, and synthetically complete polygon-bounded areas in order to show how the polygon-bounded area 415I may become synthetically complete via use of the process 301. The polygon-bounded areas 415A, 415C, 415G, 415H are incomplete. The polygon-bounded area 415E is partially complete. The polygon-bounded areas 415D, 415J are complete. The polygon-bounded areas 415B, 415F, 415I are synthetically complete.

At this point in time, the process 301 proceeds to the off-page reference D (at FIG. 3C). Further, the process 301 will proceed to synthetically complete other incomplete polygon-bounded areas. For example, the polygon-bounded area 415G is still incomplete and will be synthetically completed via the process 301 at the block 321.

Figure 4L:
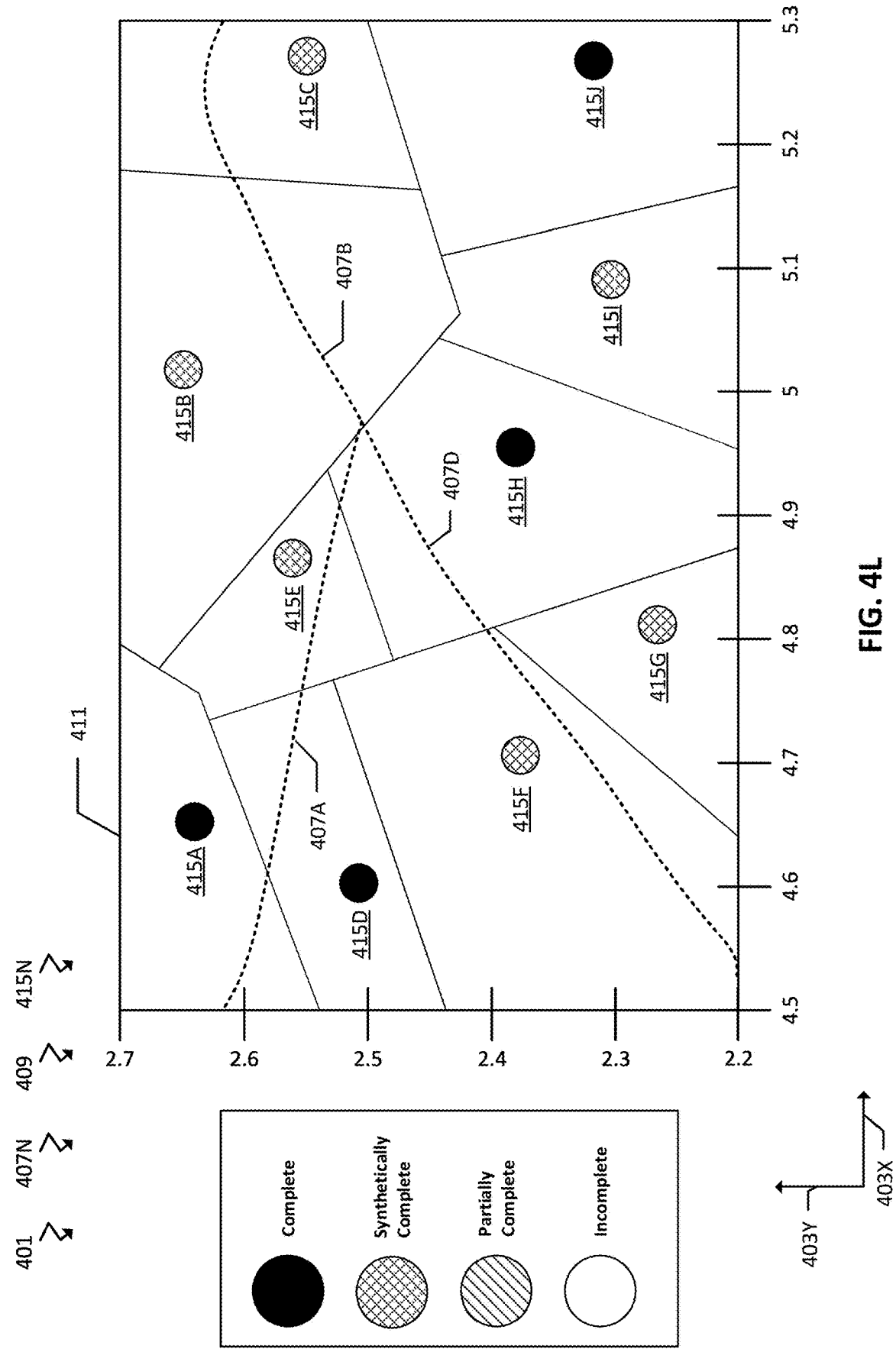
FIG. 4L is a block diagram illustrating a bounding subregion.

FIG. 4L is a block diagram illustrating the bounding subregion 411. The plurality of polygon-bounded areas 415N is shown with each polygon-bounded area being either complete or synthetically complete. The plurality of alignment curves 407N are also overlaid to show how the 1-D optimizer 231 will view the alignment data 255 when performing further optimizations.

FIG. 5 is a block diagram illustrating a computing device 700 suitable for use with the various aspects described. The computing device 700 is configured to store and execute the GIS management system 201, the cost map data structure 251, the cost layer data structure 267, and the process 301.

The computing device 700 may include a processor 711 (e.g., an ARM processor) coupled to volatile memory 712 (e.g., DRAM) and a large capacity nonvolatile memory 713 (e.g., a flash device). Additionally, the computing device 700 may have one or more antenna 708 for sending and receiving electromagnetic radiation that may be connected to a wireless data link and/or cellular telephone transceiver 716 coupled to the processor 711. The computing device 700 may also include an optical drive 714 and/or a removable disk drive 715 (e.g., removable flash memory) coupled to the processor 711.

The computing device 700 may include a touchpad touch surface 717 that serves as the computing device's 700 pointing device, and thus may receive drag, scroll, flick etc. gestures similar to those implemented on computing devices equipped with a touch screen display (not shown). In one aspect, the touchpad touch surface 717 may be integrated into one of the computing device's 700 components (e.g., a display 719). In one aspect, the computing device 700 may include a keyboard 718 which is operable to accept user input via one or more keys within the keyboard 718. In one configuration, the computing device's 700 housing includes the touchpad touch surface 717, the keyboard 718, and the display 719 all coupled to the processor 711. Other configurations of the computing device 700 may include a computer mouse coupled to the processor (e.g., via a USB input) as are well known, which may also be used in conjunction with the various aspects described.

FIG. 6 is a block diagram illustrating a server 800 suitable for use with the various aspects described. The server 800 is configured to store and execute the GIS management system 201, the cost map data structure 251, the cost layer data structure 267, and the process 301.

The server 800 may include one or more processor assemblies 801 (e.g., an x86 processor) coupled to volatile memory 802 (e.g., DRAM) and a large capacity nonvolatile memory 804 (e.g., a magnetic disk drive, a flash disk drive, etc.). As illustrated in FIG. 6, processor assemblies 801 may be added to the server 800 by insertion into the racks of the assembly. The server 800 may also include an optical drive 806 coupled to the processor assemblies 801. The server 800 may also include a network access interface 803 (e.g., an ethernet card, WIFI card, etc.) coupled to the processor assemblies 801 for establishing network interface connections with a network 805. The network 805 may be a local area network, the Internet, a public switched telephone network, and/or a cellular data network (e.g., LTE, 5G, etc.).

The foregoing method descriptions and diagrams/figures are provided merely as illustrative examples and are not intended to require or imply that the operations of various aspects must be performed in the order presented. As will be appreciated by one of skill in the art, the order of operations in the aspects described may be performed in any order. Words such as "thereafter," "then," "next," etc. are not intended to limit the order of the operations; such words are used to guide the reader through the description of the methods and systems described. Further, any reference to claim elements in the singular, for example, using the articles "a," "an," or "the" is not to be construed as limiting the element to the singular.

Various illustrative logical blocks, modules, components, circuits, and algorithm operations described in connection with the aspects described may be implemented as electronic hardware, computer software, or combinations of both. To clearly illustrate this interchangeability of hardware and software, various illustrative components, blocks, modules, circuits, operations, etc. have been described generally in terms of their functionality. Whether such functionality is implemented as hardware or software depends upon the particular application and design constraints imposed on the overall system. One of skill in the art may implement the described functionality in varying ways for each particular application, but such implementation decisions should not be interpreted as causing a departure from the scope of the claims.

The hardware used to implement various illustrative logics, logical blocks, modules, components, circuits, etc. described in connection with the aspects described may be implemented or performed with a general purpose processor, a digital signal processor ("DSP"), an application specific integrated circuit ("ASIC"), a field programmable gate array ("FPGA") or other programmable logic device, discrete gate logic, transistor logic, discrete hardware components, or any combination thereof designed to perform the functions described. A general-purpose processor may be a microprocessor, a controller, a microcontroller, a state machine, etc. A processor may also be implemented as a combination of receiver smart objects, e.g., a combination of a DSP and a microprocessor, a plurality of microprocessors, one or more microprocessors in conjunction with a DSP core, or any other such like configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions (or code) on a non-transitory computer-readable storage medium or a non-transitory processor-readable storage medium. The operations of a method or algorithm disclosed herein may be embodied in a processor-executable software module or as processor-executable instructions, both of which may reside on a non-transitory computer-readable or processor-readable storage medium. Non-transitory computer-readable or processor-readable storage media may be any storage media that may be accessed by a computer or a processor (e.g., RAM, flash, etc.). By way of example but not limitation, such non-transitory computer-readable or processor-readable storage media may include RAM, ROM, EEPROM, NAND FLASH, NOR FLASH, M-RAM, P-RAM, R-RAM, CD-ROM, DVD, magnetic disk storage, magnetic storage smart objects, or any other medium that may be used to store program code in the form of instructions or data structures and that may be accessed by a computer. Disk as used herein may refer to magnetic or non-magnetic storage operable to store instructions or code. Disc refers to any optical disc operable to store instructions or code. Combinations of any of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed.

The invention claimed is:

1. A method for gap filling of geographic information service ("GIS") data, the method comprising:
   determining, at at least one processor, a bounding region at or near an initial alignment;
   determining, at the at least one processor, the initial alignment within the bounding region;
   generating, at the at least one processor, a corridor buffer at or near the initial alignment and within the bounding region;
   processing, at the at least one processor, cost layer data;
   determining, at the at least one processor and based on the cost layer data, incompleteness of a plurality of polygon-bounded areas;
   determining, at the at least one processor and based on the cost layer data, partial completeness of the plurality of polygon-bounded areas;
   determining, at the at least one processor and based on the cost layer data, completeness of the plurality of polygon-bounded areas;
   generating, at the at least one processor and based on the incompleteness, the partial completeness, synthetic completeness, and the completeness of the plurality of polygon-based areas, the synthetic completeness of the plurality of polygon-bounded areas; and
   storing, at the at least one processor and in at least one memory, a rasterized cost map including the completeness and the synthetic completeness of the plurality of polygon-bounded areas.

2. The method of claim 1, in which the generating of the synthetic completeness is based on the completeness of the plurality of polygon-bounded areas, the synthetic completeness of the plurality of polygon-bounded areas, the partial completeness of the plurality of polygon-bounded areas, or a combination thereof.

3. The method of claim 1, further comprising communicating, at the at least one processor and from the at least one memory, the rasterized cost map to a one dimensional (1-D) optimizer, the 1-D optimizer being configured to optimize a profile of the initial alignment based on the completeness and synthetic completeness of the plurality of polygon-bounded areas.

4. The method of claim 1, in which the generating the corridor buffer is based on a point distribution.

5. The method of claim 1, in which the rasterized cost map comprises a two dimensional (2-D) plurality of values associated with costs to traverse.

6. An apparatus for gap filling of geographic information service ("GIS") data, the apparatus comprising:
   at least one memory; and
   at least one processor coupled to the at least one memory, the at least one processor configured:
      to determine a bounding region at or near an initial alignment;
      to determine the initial alignment within the bounding region;
      to generate a corridor buffer at or near the initial alignment and within the bounding region;
      to process cost layer data;
      to determine based on the cost layer data, incompleteness of a plurality of polygon-bounded areas;
      to determine, based on the cost layer data, partial completeness of the plurality of polygon-bounded areas;
      to determine, based on the cost layer data, completeness of the plurality of polygon-bounded areas;
      to generate, based on the incompleteness, the partial completeness, synthetic completeness, and the completeness of the plurality of polygon-based areas, the synthetic completeness of the plurality of polygon-bounded areas; and
      to store in the at least one memory, a rasterized cost map, the rasterized cost map including the completeness and the synthetic completeness of the plurality of polygon-bounded areas.

7. The apparatus of claim 6, in which the at least one processor is further configured to generate the synthetic completeness based on the completeness of the plurality of polygon-bounded areas, the synthetic completeness of the plurality of polygon-bounded areas, the partial completeness of the plurality of polygon-bounded areas, or a combination thereof.

8. The apparatus of claim 6, in which the at least one processor is further configured to communicate, from the at least one memory, the rasterized cost map to a one dimensional (1-D) optimizer, the 1-D optimizer being configured to optimize a profile of the initial alignment based on the completeness and synthetic completeness of the plurality of polygon-bounded areas.

9. The apparatus of claim 6, in which the at least one processor is further configured to generate the corridor buffer is based on a point distribution.

10. The apparatus of claim 6, in which the rasterized cost map comprises a two dimensional (2-D) plurality of values associated with costs to traverse.

11. A non-transitory computer-readable medium having program code recorded thereon, the program code executed by at least one processor and comprising:
   program code to determine a bounding region, the bounding region being at or near an initial alignment;
   program code to determine the initial alignment, the initial alignment being within the bounding region;
   program code to generate a corridor buffer, the corridor buffer being at or near the initial alignment, the corridor buffer further being within the bounding region;
   program code to process cost layer data;
   program code to determine based on the cost layer data, incompleteness of a plurality of polygon-bounded areas;

program code to determine based on the cost layer data, partial completeness of the plurality of polygon-bounded areas;
   program code to determine based on the cost layer data, completeness of the plurality of polygon-bounded areas;
   program code to generate based on the incompleteness, the partial completeness, synthetic completeness, and the completeness of the plurality of polygon-based areas, the synthetic completeness of the plurality of polygon-bounded areas; and
   program code to store, at the at least one processor and in at least one memory, a rasterized cost map, the rasterized cost map including the completeness and the synthetic completeness of the plurality of polygon-bounded areas.

12. The non-transitory computer-readable medium of claim 11, in which the program code comprises program code to generate the synthetic completeness based on the completeness of the plurality of polygon-bounded areas, the synthetic completeness of the plurality of polygon-bounded areas, the partial completeness of the plurality of polygon-bounded areas, or a combination thereof.

13. The non-transitory computer-readable medium of claim 11, in which the program code comprises program code to communicate, at the at least one processor and from the at least one memory, the rasterized cost map to a 1-D optimizer, the 1-D optimizer being configured to optimize a profile of the initial alignment based on the completeness and synthetic completeness of the plurality of polygon-bounded areas.

14. The non-transitory computer-readable medium of claim 11, in which the program code to generate the corridor buffer is based on a point distribution.

15. The non-transitory computer-readable medium of claim 11, in which the rasterized cost map comprises a two dimensional (2-D) plurality of values associated with costs to traverse.

16. An apparatus for gap filling of geographic information service ("GIS") data, comprising:
   means for determining, at at least one processor, a bounding region at or near an initial alignment;
   means for determining, at the at least one processor, the initial alignment within the bounding region;
   means for generating, at the at least one processor, a corridor buffer at or near the initial alignment and within the bounding region;
   means for processing, at the at least one processor, cost layer data;
   means for determining, at the at least one processor and based on the cost layer data, incompleteness of a plurality of polygon-bounded areas;
   means for determining, at the at least one processor and based on the cost layer data, partial completeness of the plurality of polygon-bounded areas;
   means for determining, at the at least one processor and based on the cost layer data, completeness of the plurality of polygon-bounded areas;
   means for generating, at the at least one processor and based on the incompleteness, the partial completeness, synthetic completeness, and the completeness of the plurality of polygon-based areas, the synthetic completeness of the plurality of polygon-bounded areas; and
   means for storing, at the at least one processor and in at least one memory, a rasterized cost map, the rasterized cost map including the completeness and the synthetic completeness of the plurality of polygon-bounded areas.

17. The apparatus of claim 16, further comprising means for generating the synthetic completeness, at the at least one processor, based on the completeness of the plurality of polygon-bounded areas, the synthetic completeness of the plurality of polygon-bounded areas, the partial completeness of the plurality of polygon-bounded areas, or a combination thereof.

18. The apparatus of claim 16, further comprising means for communicating, at the at least one processor and from the at least one memory, the rasterized cost map to a one dimensional (1-D) optimizer, the 1-D optimizer being configured to optimize a profile of the initial alignment based on the completeness and synthetic completeness of the plurality of polygon-bounded areas.

19. The apparatus of claim 16, in which the means for generating the corridor buffer is based on a point distribution.

20. The apparatus of claim 16, in which the rasterized cost map comprises a two dimensional (2-D) plurality of values associated with costs to traverse.

\*  \*  \*  \*  \*